US010878516B2

(12) United States Patent
Huang et al.

(10) Patent No.: US 10,878,516 B2
(45) Date of Patent: Dec. 29, 2020

(54) TAX DOCUMENT IMAGING AND PROCESSING

(71) Applicant: Intuit Inc., Mountain View, CA (US)

(72) Inventors: Nankun Huang, San Diego, CA (US); Amir Eftekhari, San Diego, CA (US); Carol A. Howe, San Diego, CA (US); Alan B. Tifford, San Diego, CA (US); Jeffrey P. Ludwig, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 48 days.

(21) Appl. No.: 13/781,571

(22) Filed: Feb. 28, 2013

(65) Prior Publication Data

US 2014/0244456 A1 Aug. 28, 2014

(51) Int. Cl.
*G06F 17/22* (2006.01)
*G07F 19/00* (2006.01)
*G06Q 40/00* (2012.01)

(52) U.S. Cl.
CPC ................... *G06Q 40/123* (2013.12)

(58) Field of Classification Search
USPC ........................................................ 705/36 T
See application file for complete search history.

(56) References Cited

U.S. PATENT DOCUMENTS 5,787,194 A 7/1998 Yair 6,317,782 B1 11/2001 Himmel et al.
6,778,703 B1 8/2004 Zlotnick
6,993,502 B1 1/2006 Gryglewicz et al.
(Continued)

FOREIGN PATENT DOCUMENTS

AU 20133379774 7/2017
EP 1052593 A2 11/2000
(Continued)

OTHER PUBLICATIONS

PCT International Search Report dated Nov. 27, 2013 in International Application No. PCT/US2013/040628 filed May 10, 2013, Form ISA 220 and 210, (5 pages).
(Continued)

*Primary Examiner* — Jason Borlinghaus
(74) *Attorney, Agent, or Firm* — DLA Piper LLP (US)

(57) ABSTRACT

Methods, systems and articles of manufacture for allowing taxpayers to utilize mobile communication or communication devices such as smartphones and tablet devices to upload tax document images and process tax document images such that resulting recognized tax data is incorporated into an electronic tax return. Authentication data is generated and provided to the taxpayer to establishing a connection with an image processor, which provides recognized tax data to the on-line tax preparation application for incorporation into the electronic tax return. Authentication data may be embodied within a URL address to the image processor that is transmitted as a SMS message to the mobile communication or computing device or encoded within a QR code such that the mobile communication or computing device can be used to take an image of and decode the QR code to determine the URL address and authentication data to establish a connection with the image processor.

24 Claims, 43 Drawing Sheets

(56) References Cited

U.S. PATENT DOCUMENTS

| | | | |
|---|---|---|---|
| 7,505,178 | B2 | 3/2009 | Erol et al. |
| 7,561,734 | B1 | 7/2009 | Wnek |
| 7,764,830 | B1 | 7/2010 | Wnek |
| 7,769,646 | B2 | 8/2010 | Wyle et al. |
| 7,844,915 | B2 | 11/2010 | Platzer |
| 7,930,226 | B1 | 4/2011 | Quinn et al. |
| 7,966,561 | B1 | 6/2011 | Nguyen et al. |
| 8,156,018 | B1 | 4/2012 | Quinn et al. |
| 8,204,805 | B2 | 6/2012 | Eftekhari et al. |
| 8,589,262 | B1 | 11/2013 | Wang |
| 8,606,665 | B1 * | 12/2013 | Shaw ........................ 705/31 |
| 8,793,574 | B2 | 7/2014 | Curtis |
| 8,885,951 | B1 | 11/2014 | Cristofano et al. |
| 9,172,699 | B1 * | 10/2015 | Vazquez ............ H04L 63/0861 |
| 9,256,783 | B2 | 2/2016 | Huang et al. |
| 9,639,900 | B2 | 5/2017 | Huang et al. |
| 2001/0049274 | A1 * | 12/2001 | Degraeve ........................ 455/412 |
| 2002/0080200 | A1 * | 6/2002 | Wong ........................ G06F 8/20 717/100 |
| 2005/0010780 | A1 | 1/2005 | Kane et al. |
| 2005/0165715 | A1 | 7/2005 | Farnham |
| 2006/0107312 | A1 * | 5/2006 | Fiske ........................ 726/5 |
| 2006/0178961 | A1 | 8/2006 | Stanley et al. |
| 2006/0271451 | A1 | 11/2006 | Varughese |
| 2007/0033118 | A1 | 2/2007 | Hopkinson |
| 2007/0053611 | A1 | 3/2007 | Wnek |
| 2007/0168382 | A1 | 7/2007 | Tillberg et al. |
| 2007/0291017 | A1 | 12/2007 | Syeda-Mahmood et al. |
| 2008/0319882 | A1 | 12/2008 | Wyle et al. |
| 2009/0070207 | A1 | 3/2009 | Engel et al. |
| 2009/0195817 | A1 | 8/2009 | Nakajima et al. |
| 2009/0228380 | A1 | 9/2009 | Evanitsky |
| 2010/0161460 | A1 | 6/2010 | Vroom et al. |
| 2010/0191460 | A1 | 6/2010 | Vroom et al. |
| 2011/0219427 | A1 * | 9/2011 | Hito et al. ........................ 726/3 |
| 2011/0249905 | A1 | 10/2011 | Singh et al. |
| 2012/0109792 | A1 | 5/2012 | Eftekhari et al. |
| 2012/0194837 | A1 | 8/2012 | Kamata |
| 2012/0211561 | A1 | 8/2012 | Lieberman et al. |
| 2012/0215669 | A1 | 8/2012 | Lieberman et al. |
| 2013/0036347 | A1 | 2/2013 | Eftekhari |
| 2013/0132867 | A1 | 5/2013 | Morris |
| 2013/0173915 | A1 * | 7/2013 | Haulund ........................ 713/159 |
| 2014/0241631 | A1 | 8/2014 | Huang |
| 2014/0244455 | A1 | 8/2014 | Huang |
| 2014/0244456 | A1 | 8/2014 | Huang et al. |
| 2015/0019413 | A1 | 1/2015 | Lazarus |
| 2016/0155202 | A1 | 6/2016 | Huang et al. |

FOREIGN PATENT DOCUMENTS

| | | | |
|---|---|---|---|
| JP | 2003006556 | A | 1/2003 |
| JP | 2004/145663 | A | 5/2004 |
| JP | 2004145663 | A | 5/2004 |
| JP | 2006133933 | A | 5/2006 |
| JP | 2010128964 | A | 6/2010 |
| KR | 100883390 | B1 | 2/2009 |
| KR | 1020090064267 | A | 6/2009 |
| WO | 2012137214 | A1 | 10/2012 |

OTHER PUBLICATIONS

PCT Written Opinion dated Nov. 27, 2013 in International Application No. PCT/US2013/040628 filed May 10, 2013, Form ISA 237, (7 pages).
PCT International Search Report dated Nov. 22, 2013 in International Application No. PCT/US2013/040647 filed May 10, 2013, Form ISA 220 and 210, (5 pages).
PCT Written Opinion dated Nov. 22, 2013 in International Application No. PCT/US2013/040647 filed May 10, 2013, Form ISA 237, (8 pages).
PCT International Search Report dated Dec. 19, 2013 in International Application No. PCT/US2013/040620 filed May 10, 2013, Form ISA 220 and 210, (6 pages).
PCT Written Opinion dated Dec. 19, 2013 in International Application No. PCT/US2013/040620 filed May 10, 2013, Form ISA 237, (13 pages).
http://support.google.com/drive/bin/answer.py?hl=en&answer=176692.
http://www.freewaregenius.com/how-to-extract-text-from-images-a-comparison-of-free-ocr-tools/.
http://www.nuance.com/for-individuals/by-product/omnipage/index.htm.
http://www.miteksystems.com/.
http://www.abbyy.com/solutions/mobile/.
http://blog.turbotax.intuit.com/2011/01/14/taxes-on-your-mobile-phone-it%E2%80%99s-a-snap/.
http://oauth.net/.
http://en.wikipedia.org/wiki/OAuth.
Office Action dated Oct. 3, 2014 in U.S. Appl. No. 13/781,393, filed Feb. 28, 2013, (8 pages).
Notice of Allowance dated Mar. 27, 2015 in U.S. Appl. No. 13/781,393, filed Feb. 28, 2013, (14pages).
Restriction Requirement dated Apr. 2, 2015 in U.S. Appl. No. 13/781,540, filed Feb. 28, 2013, (7pages).
http://www.apple.com/osx/what-is/gestures.html#gallery-gestures-tap-zoom.
Non-Final Office Action dated May 28, 2015 in U.S. Appl. No. 13/781,393, filed Feb. 28, 2013, (13pp).
Amendment dated Aug. 28, 2015 in U.S. Appl. No. 13/781,393, filed Feb. 28, 2013, (26pp).
Notice of Allowance dated Oct. 5, 2015 in U.S. Appl. No. 13/781,393, filed Feb. 28, 2013, (14pp).
PCT International Preliminary Report on Patentability (Chapter I of the Patent Cooperation Treaty) for PCT/US2013/040628, Applicant: INTUIT Inc, Form PCT/IB/326 and 373, dated Sep. 11, 2015 (9pp).
Non-Final Office Action dated Apr. 16, 2015 in U.S. Appl. No. 13/781,540, filed Feb. 28, 2013, (34pp).
Final Office Action dated Sep. 3, 2015 in U.S. Appl. No. 13/781,540, filed Feb. 28, 2013, (17pp).
PCT International Preliminary Report on Patentability (Chapter I of the Patent Cooperation Treaty) for PCT/US2013/040647, Applicant: INTUIT Inc, Form PCT/IB/326 and 373, dated Sep. 11, 2015 (11pp).
PCT International Preliminary Report on Patentability (Chapter I of the Patent Cooperation Treaty) for PCT/US2013/040620, Applicant: INTUIT Inc, Form PCT/IB/326 and 373, dated Sep. 11, 2015 (15pp).
Response to Non-Final Office Action dated Jan. 5, 2015 in U.S. Appl. No. 13/781,393, filed Feb. 28, 2013, (8pages).
Response to Final Office Action dated Dec. 3, 2015 in U.S. Appl. No. 13/781,540, filed Feb. 28, 2013, (39pages).
Office Action dated Jun. 3, 2016 in U.S. Appl. No. 13/781,540, filed Feb. 28, 2013, (38pages).
Response to Office Action dated Sep. 30, 2016 in U.S. Appl. No. 13/781,540, filed Feb. 28, 2013, (46pages).
Office Action dated Nov. 10, 2016 in U.S. Appl. No. 13/781,540, filed Feb. 28, 2013, (43pages).
Office Action dated Jul. 1, 2016 in U.S. Appl. No. 15/018,662, filed Feb. 8, 2016, (20pages).
Response dated Sep. 30, 2016 in U.S. Appl. No. 15/018,662, filed Feb. 8, 2016, (32pages).
Notice of Allowance dated Dec. 14, 2016 in U.S. Appl. No. 15/018,662, filed Feb. 8, 2016, (18pages).
Response to Examiner's Report dated Jan. 31, 207 in Australian Application No. 2013379774. (46pages).
Patent Examination Report No. 1 dated Jun. 30, 2016 in Australian Patent Application No. 2013379774, (3pages).
The extended European search report dated Oct. 24, 2016 in European Patent Application No. 13876600.1-1958, (8pages).
Office Action dated Aug. 23, 2016 in Canadian Patent Application No. 2901804, (5pages).

(56) References Cited

OTHER PUBLICATIONS

The extended European search report dated Jul. 4, 2016 in European Patent Application No. 13876201.8-1958, (10pages).
Mark Stam: "Chapter 7: Authentication", Information Security: Principles and Practice, Second Edition, Sep. 9, 2011, pp. 229-264, XP055265562, DOI: 10.1002/9781118027974 (37pages).
Patent Examination Report No. 1 dated Aug. 10, 2016 in Australian Patent Application No. 2013379776, (6pages).
Tax Import: Importing Scanned Documents [Viewed on internet on Aug. 10, 2016] viewed on internet. URL:https://www.youtube.com/watch?=MDz-UHPukBY, published on Dec. 8, 2011.
Office Action dated Aug. 23, 2016 in Canadian Patent Application No. 2901804, (6pages).
Patent Examination Report No. 1 dated Sep. 9, 2016 in Australian Patent Application No. 2013379775, (3pages).
Office Action dated Sep. 7, 2016 in Canadian Patent Application No. 2900818, (4pages).
Communication pursuant to Rules 161(2) and 162 EPC dated Oct. 21, 2015 in European Patent Application No. 13876409.7, (2pages).
Response to Communication Rules 161(2) and 162 EPC dated Apr. 13, 2016 in European Patent Application No. 13876409.7, (10pages).
Response to Final Office Action and Request for Continued Examination dated Feb. 10, 2017 in U.S. Appl. No. 13/781,540, (36pages).
Office Action dated Jun. 9, 2017 in U.S. Appl. No. 13/781,540, (18pages).
Examination report No. 2 for standard patent application in Australian Patent Application No. 2013379776, dated Mar. 15, 2017, (5pages).
Response dated Feb. 23, 2017 in Canadian Patent Application No. 2,901,815, (19pages).
Response dated Jan. 30, 2017 in European Patent Application No. 13876201.8, (15pages).
Examination—Response to an Examiner's Report dated Jan. 31, 2017 in Australian Patent Application No. 2013379774, (46pages).
Response dated Feb. 23, 2017 in Canadian Patent Application No. 2,901,804, (30pages).
Response dated Mar. 3, 2017 in Canadian Patent Application No. 2,900,818, (6pages).
Tax Import: Importing Scanned Documents [Viewed on internet on Aug. 10, 2016] Viewed on internet. <URL:https://www.youtube.com/watch?v=MDz-UHPukBy>. Reference is cited in Australian Patent Application No. 2013379776, (1page).
Rule 312 Amendment dated Mar. 13, 2017 in U.S. Appl. No. 15/018,662, (14pages).
Response to Rule 312 Amendment dated Mar. 22, 2017 in U.S. Appl. No. 15/018,662, (2pages).
Office Action dated May 18, 2017 in Canadian Patent Application No. 2,901,804, (5pages).
Notice of Acceptance for patent application in Australian Patent Application No. 2013379774, (3pages).
Response to Extended European Search Report dated May 22, 2017 in European Patent Application No. 13876600.1-1958, (8pages).
Examination report No. 2 for standard patent application in Australian Patent Application No. 2013379775 dated Apr. 13, 2017, (3pages).
Response to Examination report No. 2 for standard patent application in Australian Patent Application No. 2013379775 dated Apr. 13, 2017, (5pages).
Examination report No. 3 for standard patent application in Australian Patent Application No. 2013379775 dated May 26, 2017, (3pages).
Response to Examination report No. 3 for standard patent application in Australian Patent Application No. 2013379775 dated Aug. 1, 2017, (30pages).
Response to Examination report in Canadian Patent Application No. 2,910,952 dated Apr. 27, 2017, (14pages).
Examination report in Canadian Patent Application No. 2,910,952 dated Jul. 14, 2017, (3pages).
Supplementary European Search Report dated Feb. 27, 2017 in European Patent Application No. 13876409, (9pages).
Notice of acceptance for patent application in Australian Patent Application No. 2013379776, (3pages).
Canadian Office Action issued in CA 2,901,804 dated Jul. 31, 2018.
Canadian Office Action issued in CA 2,901,804 dated Apr. 3, 2019.
U.S. Appl. No. 13/781,393, filed Feb. 28, 2013.
U.S. Appl. No. 13/781,540, filed Feb. 28, 2013.
U.S. Appl. No. 15/018,662, filed Feb. 8, 2016.

* cited by examiner

Pat Williams

Street address (including apt. no.)
3434 North Canyon Court

City, state, and ZIP code
Chula Vista, CA 92056

FIG. 27

| Segment 2810a | Segment Coordinates 2810b | Classification 2810c | Recognition Data 2810d | Feature 2810e | Feature Coordinates 2810f | Doc Type / Template 2810g | Template Coordinates 2810h | Document Image 2810i | Image Coordinates 2810j |
|---|---|---|---|---|---|---|---|---|---|
| Segment 1 | SegCoord1 | Class1 | Recog 1 | Feature1 | FCoord 1 | Type 1 | TCoord 1 | Image 1 | ICoord1 |
| Segment 2 | SegCoord2 | Class1 | Recog 2 | Feature1 | FCoord 1 | Type 1 | TCoord 1 | Image 1 | ICoord1 |
| Segment 3 | SegCoord3 | Class2 | --- | Feature2 | FCoord 2 | Type 1 | TCoord 1 | Image 1 | ICoord1 |
| Segment 4 | SegCoord4 | Class3 | Recog 3 | Feature2 | FCoord 2 | Type 2 | TCoord 2 | Image 2 | ICoord2 |
| Segment 5 | SegCoord5 | Class1 | --- | Feature2 | FCoord 2 | Type 2 | TCoord 2 | Image 2 | ICoord2 |
| Segment 6 | SegCoord6 | Class3 | --- | Feature2 | FCoord 2 | Type 2 | TCoord 2 | Image 2 | ICoord2 |

FIG. 28A

| UI Element 2820a | Screen/Form Location 2820b | Data Store Location 2820c | Tax Document Image 2820d | Image Coordinates 2820e |
|---|---|---|---|---|
| UI 1 | SF Loc 1 | Location 1 | Image 1 | image-1-Coord 1 |
| UI 2 | SF Loc 2 | Location 2 | Image 1 | image-1-Coord 2 |
| UI 3 | SF Loc 3 | Location 3 | Image 1 | image-1-Coord 3 |
| UI 4 | SF Loc 4 | Location 4 | Image 2 | image-2-Coord 1 |
| UI 5 | SF Loc 5 | Location 5 | Image 2 | image-2-Coord 2 |
| UI 6 | SF Loc 6 | Location 6 | Image 3 | image-3-Coord 1 |

FIG. 28B

| Field of Interview Screen / Tax Return Form 2830a | Screen/Form Location 2830b | UI Element 2830c | Recognition Data 2830d |
|---|---|---|---|
| Screen 1, Field 1 | SF Loc 1 | UI 1 | Recog 1 |
| Screen 1, Field 2 | SF Loc 2 | UI 2 | Recog 2 |
| Screen 1, Field 3 | SF Loc 3 | UI 3 | Recog 3 |
| Screen 1, Field 4 | SF Loc 4 | UI 4 | Recog 4 |
| Screen 2, Field 1 | SF Loc 5 | UI 5 | Recog 5 |
| Screen 2, Field 1 | SF Loc 6 | UI 6 | Recog 6 |

FIG. 28C

Enter the Details from Your W-2

Employer Name
Starbucks, Inc

Employer Address (from box c of W-2)
123 Main Street
San Diego  CA  92138

Employer Identification Number (EIN)
Box D of W-2 (EIN)
An employer ID # must have 9 digits.

Box 1 Wages, Tips, and Other Compensation
$ 34128.00

Box 2 Federal Income Tax Withheld
$ 5430.10

If there is no tax withheld, enter "0".

Close   Save changes

Enter the Details from Your W-2

Employer Name
Starbucks, Inc

Employer Address (from box c of W-2)
123 Main Street
San Diego | CA | 92138

Employer Identification Number (EIN)
Box D of W-2 (EIN)
An employer ID # must have 9 digits.

Box 1 Wages, Tips, and Other Compensation
$ 34128.00

Box 2 Federal Income Tax Withheld
$ 5430.10

If there is no tax withheld, enter "0".

Close | Save changes

Enter the Details from Your W-2

Employer Name
Starbucks, Inc

Employer Address (from box c of W-2)
123 Main Street
San Diego  CA  92138

Employer Identification Number (EIN)
Box D of W-2 (EIN)
An employer ID # must have 9 digits.

Box 1 Wages, Tips, and Other Compensation
$ 34128.00

Box 2 Federal Income Tax Withheld
$ 5430.10

If there is no tax withheld, enter "0".

Close    Save changes

FIG. 34C

Enter the Details from Your W-2

Employer Name
Starbucks, Inc

Employer Address (from box c of W-2)
123 Main Street
San Diego | CA | 92138

Employer Identification Number (EIN)
Box D of W-2 (EIN)
*An employer ID # must have 9 digits.*

Box 1 Wages, Tips, and Other Compensation
$ | 34128.00

Box 2 Federal Income Tax Withheld
$ | 5430.10

*If there is no tax withheld, enter "0".*

[ Close ] [ Save changes ]

FIG. 34D

Enter the Details from Your W-2

San Diego | CA | 92138

Employer Identification Number (EIN)

Box D of W-2 (EIN)

An employer ID # must have 9 digits.

Box 1 Wages, Tips, and Other Compensation
$ | 34128.00

Box 2 Federal Income Tax Withheld
$ | 5430.10
If there is no tax withheld, enter "0".

Box 3 Social Security Wages
$ | 34128.00

Box 4 Social Security Tax Withheld
$ | 1433.36

Box 5 Medicare Wages and Tips
$ | 34128.00

Box 6 Medicare Tax Withheld

Close | Save changes

Enter the Details from Your W-2

San Diego | CA | 92138

Employer Identification Number (EIN)

Box D of W-2 (EIN)

An employer ID # must have 9 digits.

Box 1 Wages, Tips, and Other Compensation
$ | 34128.00

Box 2 Federal Income Tax Withheld
$ | 5430.10
If there is no tax withheld, enter "0".

Box 3 Social Security Wages
$ | 34128.00

Box 4 Social Security Tax Withheld
$ | 1433.36

Box 5 Medicare Wages and Tips
$ | 34128.00

Box 6 Medicare Tax Withheld

Close | Save changes

Enter the Details from Your W-2

San Diego | CA | 92138

Employer Identification Number (EIN)

Box D of W-2 (EIN)

An employer ID # must have 9 digits.

Box 1 Wages, Tips, and Other Compensat $ | 34128.00

Box 2 Federal Income Tax Withheld $ | 5430.10

If there is no tax withheld, enter "0".

Box 3 Social Security Wages $ | 34128.00

Box 4 Social Security Tax Withheld $ | 1433.36

Box 5 Medicare Wages and Tips $ | 34128.00

Box 6 Medicare Tax Withheld

— 228p

— 3410

| 1 Wages, tips, other compensation 34128.00 | 2 Federal income tax withheld 5430.10 |
| 3 Social security wages 34128.00 | 4 Social security tax withheld 1433.36 |
| 5 Medicare wages and tips 34128.00 | 6 Medicare tax withheld 494.86 |
| 7 Social security tips | 8 Allocated tips |

Close | Save changes

FIG. 35D

TAX DOCUMENT IMAGING AND PROCESSING

SUMMARY

Embodiments are directed to presenting taxpayers or users of an on-line tax preparation application with options for how to enter data into an electronic tax return including the option of imaging or taking a photograph of a tax document. Embodiments are also directed to secure transfer and processing of images of tax documents. Embodiments are also directed to entry of tax return data utilizing different computing devices such that the document that is utilized to acquire and transmit a tax document image for processing and importation into an electronic tax return is not the computing device that was utilized to initiate preparation or prepare the electronic tax return. For example, a user may be executing a browser on a desktop computer to access an on-line tax preparation application and chooses to acquire images of a tax document using a smartphone or tablet computing device. Thus, the electronic tax return can be prepared utilizing different types of computing devices, while providing for secure transfer and processing of tax document images. Embodiments are also directed to allowing users of a tax preparation application to capture tax document images without having to download a separate application or sign into a separate account. Embodiments are also directed to how tax document images are securely transferred utilizing a token or other authentication data generated by the on-line tax preparation application.

One embodiment is directed to a computer-implemented method for processing an image of a tax document and comprises a first or host computer comprising or hosting an on-line tax preparation application that receives a request from a first computing apparatus utilized by a taxpayer. The first computing apparatus is used by the taxpayer to access the on-line tax preparation application and prepare the electronic tax return, and the taxpayer has requested, through the first computing apparatus, to acquire an image of a tax document. In response, the on-line tax preparation application or first computer provides authentication data to the taxpayer in response to the request. The authentication data is used by a second computing apparatus different than the first computing apparatus to allow the second computing apparatus to acquire the image and transmit the image to an intermediate, second computer, which is in communication with the first computer and the second computing apparatus. The first computer receives data comprising a result of image processing (e.g., optical character recognition) performed by the second computer. The first computer may then populate fields of the electronic tax return or fields of interview screens corresponding to tax return fields with the received data, and that data is viewable by the taxpayer utilizing the first computing apparatus.

A further embodiment is directed to a computer-implemented method for processing an image of a tax document and comprises a first or host computer comprising an on-line tax preparation application, which is accessed by a browser executing on a first computing apparatus of the taxpayer and utilized to prepare the electronic tax return, generating an authentication token for use by a different, second computing apparatus for the purpose of transmitting an image of a tax document to an intermediate, second computer in communication with the first computer and the second computing apparatus. The method further comprises the first computer receiving data resulting from the second computer processing the image received from the second computing apparatus and populating at least a portion of the electronic tax return with the received data.

Yet another embodiment is directed to a computer-implemented method for processing an image of a tax document and comprises a first or host computer comprising an on-line tax preparation application and receiving a request from a computer of a taxpayer used to initiate preparation of the electronic tax return (e.g., a desktop or laptop computer) to enter data into the electronic tax return by acquiring an image a tax document. The method further comprises providing the authentication token to the taxpayer in response to the request. The authentication token is usable by a mobile communication or computing device of the taxpayer and operable by the taxpayer to acquire and transmit an image of the tax document from the mobile device to an intermediate, second computer. The method further comprises receiving data resulting from processing of the image by the second computer and populating at least a portion of the electronic tax return with the received data.

A further embodiment is directed to a computer-implemented method for processing an image of a tax document and comprises an intermediate, second computer, which is in communication with a first or host computer comprising an on-line tax preparation application accessed by a first computing apparatus of a taxpayer to prepare the electronic tax return, receiving a request from a second computing apparatus different than the first computing apparatus to process an image of a tax document acquired by the second computing apparatus. The method further comprises the intermediate or second computer receiving an authentication token from the second computing apparatus, establishing a secure connection session with the second computing apparatus based at least in part upon the authentication token, receiving the image of the tax document transmitted from the second computing apparatus and processing the image to determine tax data within the image. The intermediate or second computer then transmits the determined tax data to the first computer for populating of at least a portion of the electronic tax return.

Yet another embodiment is directed to a computer-implemented method for processing an image of a tax document comprising a first or host computer, which comprises an on-line tax preparation application, receiving a request from a first computing apparatus utilized by a taxpayer to access the on-line tax preparation application to enter data into the electronic tax return by acquiring an image a tax document. The method further comprises the first computer generating authentication data in response to the request and transmitting the authentication data to the first computing apparatus of the taxpayer. The method further comprises an intermediate, second computer, in communication with the first computer and a second computing apparatus of the taxpayer, receiving a request from the second computing apparatus to process an image of a tax document acquired by the second computing apparatus. The request includes the authentication data (e.g., a token embodied within a URL address utilized by the second computing apparatus). The method further comprises the second computer establishing a connection session with the second computing apparatus based at least in part upon the authentication data, receiving the image of the tax document acquired with and transmitted from the second computing apparatus, processing the image to determine tax data within the image and transmitting the determined tax data to the first computer. The method further comprises the first computer receiving the determined tax data from the second computer and populating at least a portion of the electronic tax return with the determined tax data.

Another embodiment is directed to a method for preparing an electronic tax return utilizing an on-line tax preparation application and an image of a tax document. The method comprises utilizing a first computing apparatus and executing a browser to access the on-line tax preparation program hosted by a first computer. The method further comprises beginning preparation of the electronic tax return, transmitting a request for entry of tax data into the electronic tax return by imaging a tax document, the request being generated by and transmitted from the first computing apparatus. The method further comprises receiving electronic data comprising a Uniform Resource Locator (URL) address of an intermediate, second computer and embodying authentication data generated by the first computer, establishing a connection between a second computing apparatus and the second computer based at least in part upon the authentication data and acquiring an image of the tax document utilizing an imaging element of the second computing apparatus. The method further comprises transmitting the acquired image to the second computer and viewing tax data of the image in the electronic tax return utilizing the first computing apparatus.

Further embodiments are directed to systems for processing an image of a tax document and populating at least a portion of an electronic tax return. System embodiments may comprise the first or host computer and/or the intermediate, second computer.

Yet other embodiments are directed to computer program products or articles of manufacture comprising a non-transitory computer readable medium tangibly embodying one or more sequences of instructions wherein execution of the one or more sequences of instructions by one or more processors contained in one or more computing systems causes the one or more computing systems to process tax document images and/or populate at least a portion of an electronic tax return according to method embodiments.

In a single or multiple embodiments, the authentication data is or comprises an authentication token generated by the first or host computer in response to the taxpayer's request to enter tax return data by taking a photograph of a tax document. The authentication data may be utilized by the taxpayer subject to various restrictions or limitations including duration and/or use restrictions. For example, a restriction may specify that a token must be used within a pre-determined time or may only be a single use token.

In a single or multiple embodiments, the first computer receives an electronic message from the second computer that the authentication data received by the second computer could not be utilized. The taxpayer may be notified that the authentication data was not valid, or new authentication data can be generated so that the taxpayer can attempt to acquire or transmit the image again.

In a single or multiple embodiments, authentication data, such as a token, may be used during a particular connection session with the second computer to image multiple tax documents. In other embodiments, the first computer generates authentication data for each tax document to be imaged.

In a single or multiple embodiments, the first or host computer generates the authentication data and transforms it into a different form, which is then provided to the taxpayer. For example, the first or host computer may encode a QR or other readable code or matrix with a Uniform Resource Locator (URL) address embodying a token. The on-line tax preparation application comprising the generated QR code can be accessed by the browser executing on the first computing apparatus such that the QR code is displayed on a screen of the first computing apparatus. The taxpayer may then utilize a different, second computing apparatus to take a photograph of the QR code displayed on the screen of the first computing apparatus by positioning the second computing apparatus relative to the first computing apparatus screen so that the QR code is view of an imaging element or camera of the second computing apparatus, and then taking a photograph the displayed QR code. In another embodiment, the first or host computer generates a SMS message comprising a Uniform Resource Locator (URL) address embodying the authentication data and transmits the SMS message to the second computing apparatus. Thus, while the first computing apparatus executes a browser to access the on-line tax preparation application and request to enter data by imaging a tax document, the SMS message is not transmitted to the first computing apparatus utilized to access the on-line tax preparation program and instead is transmitted to the different, second computing apparatus, which communicates with the intermediate, second computer.

In a single or multiple embodiments, the first computing apparatus is desktop computer executing a browser to access the on-line tax preparation application, and the second computing apparatus is a mobile communication or computing device such as a tablet or smartphone device.

BRIEF DESCRIPTION OF THE DRAWINGS

The foregoing and other aspects of embodiments are described in further detail with reference to the accompanying drawings, wherein:

FIG. 27 illustrates an example of segmentation of a source tax document image resulting from image processing according to embodiments;

FIGS. 28A-C illustrate examples of tables or data structures that may be generated and maintained according to embodiments for encoding user interface elements and populating interview screen fields according to embodiments;

FIGS. 34A-E are screen shots illustrating one example of how embodiments may be implemented to display a Form W2 or portion thereof through a tax preparation application in response selection of a user interface element of the tax preparation application and how zooming can be applied to the source document image portions;

FIGS. 35A-D are screen shots illustrating another example of how embodiments may be implemented to display a Form W2 or portion thereof through a tax preparation application in response selection of a user interface element of the tax preparation application and how zooming can be applied to the source document image portions;

DETAILED DESCRIPTION OF ILLUSTRATED EMBODIMENTS

Certain embodiments relate to using different computing or communication devices for preparing an electronic tax return and imaging tax documents.

Certain embodiments relate to secure transfer of tax document images for processing by an intermediate computer to tax data within the image, and to integrate recognized data into an electronic tax return being prepared utilizing a tax preparation application. Embodiments may involve utilizing a first computing apparatus (such as a desktop or laptop computer) to access an on-line version of a tax preparation application and a different, second computing apparatus (such as a mobile communication device) to acquire an image of a tax document and transmit the image using a token or other authentication data to an intermediate computer, which processes the image and communicates the image and/or image processing results to a computer of the host of the on-line tax preparation application.

Certain other embodiments relate processing a received or acquired image of a tax document that is a source of data for a field of an interview screen or electronic tax return form and presenting the image of the tax document or portion thereof associated with a particular field of an interview screen or form through the tax preparation application. This allows a taxpayer or user of the tax preparation application to view the image of the source and determine data that should be included in a field or to verify or confirm data that was entered or imported into a field.

Embodiments directed to how images are acquired and how authentication data is generated and processed for acquiring and transmitting images are described with reference to FIGS. 1-18, and embodiments directed to image processing and encoding of user interface elements for displaying an image of a source of tax data through the tax preparation application are described with reference to FIGS. 19-36. It will be understood that while embodiments may be utilized together, they may also be implemented independently of each other. For example, embodiments directed to image processing and encoding of user interface elements for displaying an image may be implemented using or in conjunction with system configurations and methods described with reference to FIGS. 1-18, as well as with other system configurations.

Tax Document Image Acquisition, Transfer and Processing

Figure 1:
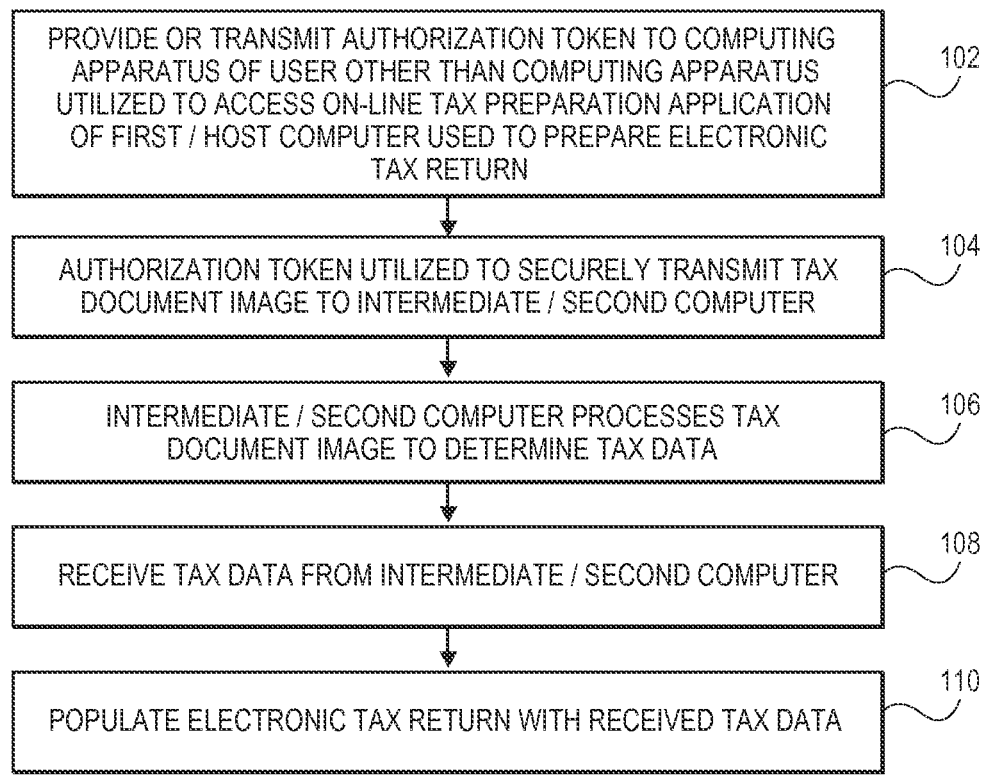
FIG. 1 illustrates a method for acquiring and processing an image of a tax document according to embodiments.

Referring to FIG. 1, in a method according to one embodiment, at 102, a first or host computer that hosts or manages an on-line tax preparation application or web application for preparing electronic tax returns provides or transmits authentication data to a first computing apparatus of a taxpayer. The first computing apparatus is utilized to access the first or host computer and access the on-line tax preparation application. The authentication data may be a token. At 104, the authentication data is used to establish a connection between a different computing apparatus and an intermediate, second or image capture or processing computer. The image acquired with the other computing apparatus is transmitted to the second computer. At 106, the second computer processes tax document image (e.g., by applying image analysis or Optical Character Recognition (OCR)) to determine tax data within the image, and at 108, the first or host computer receives recognized tax data from the second computer. At least one field of the electronic tax return may be populated with received tax data.

For example, the taxpayer may request entry of tax data by imaging of a tax document, and request to receive a readable code such as a Quick Response (QR) code or other code or matrix. The first computer, or on-line tax preparation application, generates an authorization token, encodes a QR code with a URL address embodying the token, and allows the taxpayer to access the QR code, which is displayed on a screen of the first computing apparatus. The taxpayer then uses a different computing apparatus to scan or take a picture of the QR code that is displayed on the screen of the first computing apparatus. Decoding the QR code results in determining the URL address, and the other computing apparatus is directed to the URL address of the intermediate or second computer via a secure connection using the token. As another example, the first computer or on-line tax preparation application may transmit a SMS message including the URL address embodying the token to the other computing apparatus. As another example, the SMS or other message (such as electronic mail message) sent to the second computing apparatus may include the generated QR code (and/or URL including token without a QR code), and when the SMS or other message is opened, the QR code may then be scanned or decoded to determine the URL address. Image processing results are transmitted to the first computer and incorporated into the electronic tax return such that the taxpayer can view the imported data using the first computing apparatus or other computing apparatus having a browser that can be utilized to access the on-line tax preparation application. Further aspects of embodiments are described with reference to FIGS. 2-19.

Figure 2:
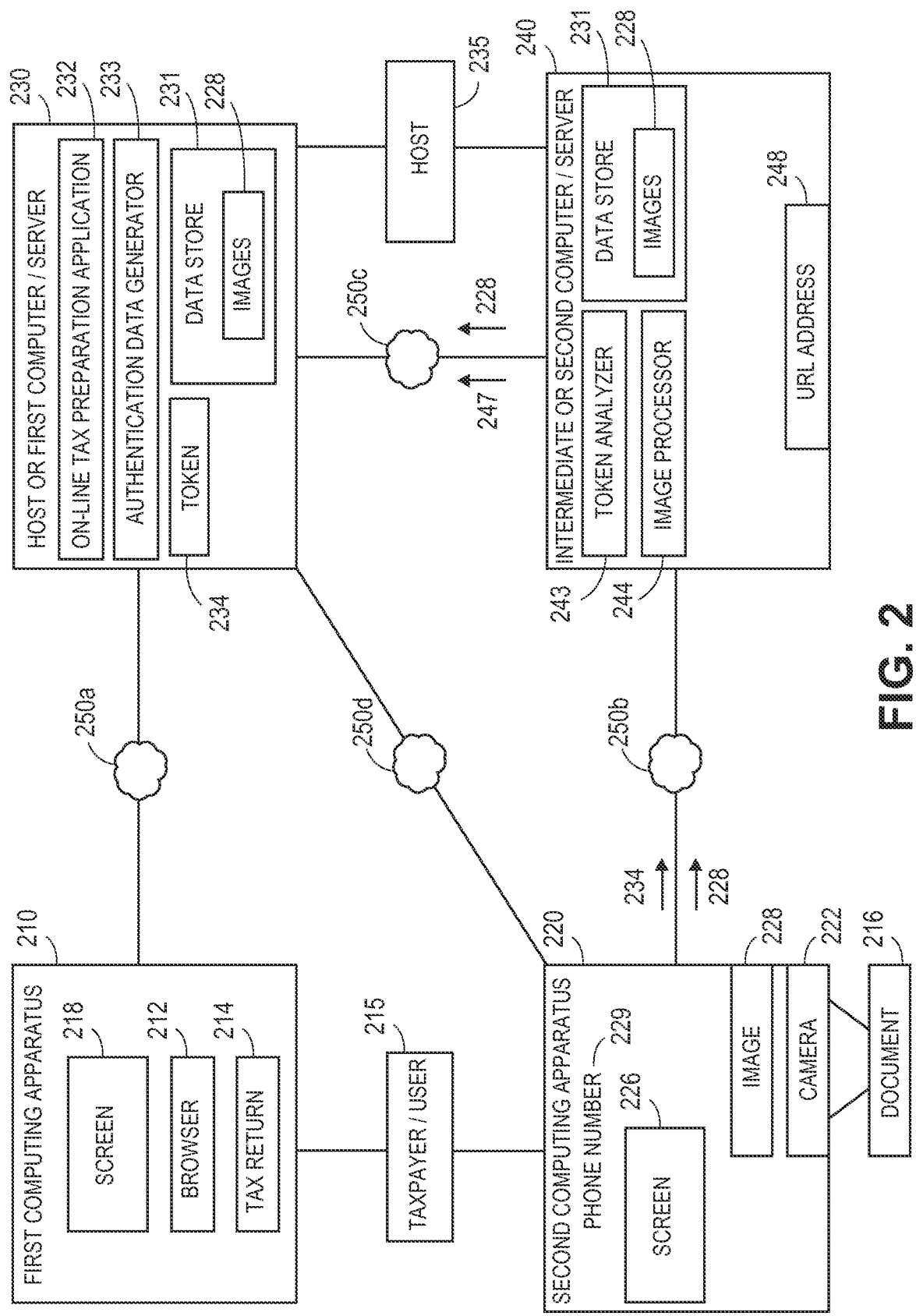
FIG. 2 is a block diagram illustrating a system constructed according to embodiment or involving components for acquiring and processing an image of a tax document according to embodiments.

Referring to FIG. 2, a system constructed according to one embodiment and components thereof that are utilized or involved in execution of methods comprises or involves computing or communication apparatus or devices 210, 220 of a user or taxpayer 215 (generally, "taxpayer") that is preparing an electronic tax return 214 utilizing a web application or on-line tax preparation application 232. Reference is made generally to a taxpayer 215, but it will be understood that taxpayer 215 may be the actual taxpayer or user of the on-line tax preparation application 232 or a person or entity for which an electronic tax return 232 is being prepared. The system includes or involves a first or host computer or server 230 (generally, "host computer") of a host 235 and comprising the on-line tax preparation application 232, and an intermediate, second, or image capture and processing computer or server 240 (generally, "intermediate computer"), which may be managed by the same host 235 as shown in FIG. 2 or by a different host. Although not illustrated in FIG. 2, the first or host computer 230 may be in communication with a computer of a tax authority for purposes of electronically filing tax returns. System components are in communication with each other through respective networks 250*a-d*, and as described below, system and network configurations depend on the particular embodiment implemented such that some or all of the communications and networks shown in FIG. 2 may be utilized.

The taxpayer's first computing apparatus 210 is in communication through a network 250*a* with the host computer 230 and executes a browser 212 to access the on-line tax preparation application or web application 232 ("on-line tax preparation application") to prepare an electronic tax return 214 based at least in part upon data within tax documents 216 of the taxpayer 215. A tax document 216 as used herein refers to a tangible medium that contains tax data thereon or therein and that is visually perceptible to the human eye. Interview screens generated by the on-line tax preparation application 232 are displayed on a screen 218 of the first computing apparatus 210. One example of an on-line tax preparation application 232 is turbotax.com, available from Intuit Inc., Mountain View, Calif.

According to embodiments the first computing apparatus 210 may be a desktop, laptop or other computer or computing apparatus executing the browser 212 to access the on-line tax preparation application 232, whereas the second computing apparatus 220 is different and separate from the first computing apparatus 210 and movable relative to the first computing apparatus 210, and wherein the second computing apparatus 220 was not utilized to begin preparation of or prepare the electronic tax return 214. According to embodiments, the second computing apparatus 220 is a mobile computing or communication device such as a tablet computing or communication device, smartphone or other mobile communication device. As generally illustrated in FIG. 2, the second computing apparatus 220 also includes a screen 226 as well as a camera 222 or other image or video capture element operable to acquire image 228 in the form of a photograph or frame of video of a tax document 216, as described in further detail below.

The host computer 230 may serve as an electronic filing server operable to electronically file tax returns with the tax authority computer through a network with the tax authority computer. The tax authority with which tax returns are filed may be a federal tax authority such as the Internal Revenue Service (IRS), a state tax authority such as the State Franchise Board of California or other tax collecting entity to which taxes are paid. Examples of tax documents 216 for a tax authority such as the Internal Revenue Service (IRS) include: W-2, 1099-A, 1099-B, 1099-C, 1099-DIV, 1099-G, 1099-H, 1099-INT, 1099-OID, 1099-LTC, 1099-PATR, 1099-Q, and 1098. This listing, however, should be understood as illustrative and not exhaustive. For ease of explanation, reference is made generally to a tax authority, but it will be understood that tax authority refers to various tax collecting entities, including local, state and federal tax collecting entities.

The first computing apparatus 210 is in communication with the host computer 230 to access the on-line tax preparation application 232 over a network 250a, and a connection through a network 250b can be established between the second computing apparatus 220 and the intermediate computer 240, which is in communication with the host computer 230 via network 250c. Depending on the particular embodiment, the host computer 230 may also be in communication through a network 250d with the second computing or communication apparatus 220 as shown in FIG. 2. Each of the networks 250a-d (generally, network 250) and other networks discussed herein (generally network 250) may be different, or two or more networks may be the same depending on the system configuration and communication protocols employed. One or more or all of the networks may be, for example, a cellular network, a wireless network, a Local Area Network (LAN) and/or a Wide Area Network (WAN) or a combination of two or more networks. Reference to a network 250 generally is not intended to refer to a specific network or communications protocol, and it should be understood that embodiments can be implemented using various networks and combinations thereof.

With continuing reference to FIG. 2, the first computer 230 hosting the on-line tax preparation application 232 also includes a data store 231 for storing data such as completed tax returns or tax returns 214i n the process of being completed, authentication data 234 such as a token (generally, token 234) and/or document images 228 generated according to embodiments, an authentication data generator 233 or manager that generates tokens 234. While FIG. 2 illustrates the on-line tax preparation application 232 and authentication data generator 233 as separate components, the authentication data generator 233 may also be a module or component of the on-line tax preparation application 232. A token 234 is a type of data or series of bits that is transmitted around different system components, which may capture the token 234 to allow the owner of the token 234 to transmit messages or establish a connection with another system component across a network. According to embodiments, a token 234 is eventually utilized by the second computing apparatus 220 and intermediate computer 240, which includes a token analyzer 243 to determine whether to establish a secure connection (e.g., Secure Sockets Layer (SSL)) with the second computing apparatus 220 based on the token 234. The intermediate computer 240 also includes an image processor 244, which may utilize image processing programs such as OCR to determine data within an image 228 of a tax document 216 and a data store 241 to store images 228 and associated data such as results 247 generated by image processor 244.

Having described system components, their capabilities and how they may operate and communicate with each other, further aspects of how embodiments may be implemented with the system components shown in FIG. 2 are described in further detail with reference to FIGS. 3-19.

Figure 3:
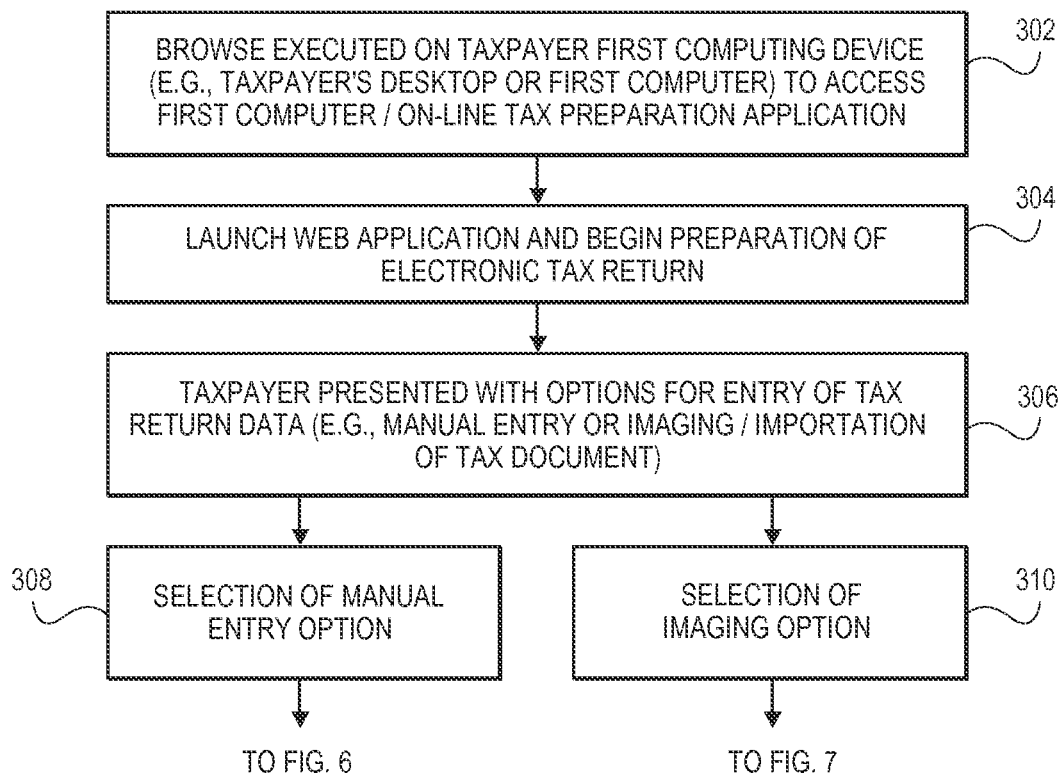
FIG. 3 illustrates a method for presenting a taxpayer with options for how to enter data into an electronic tax return.
Figure 4:
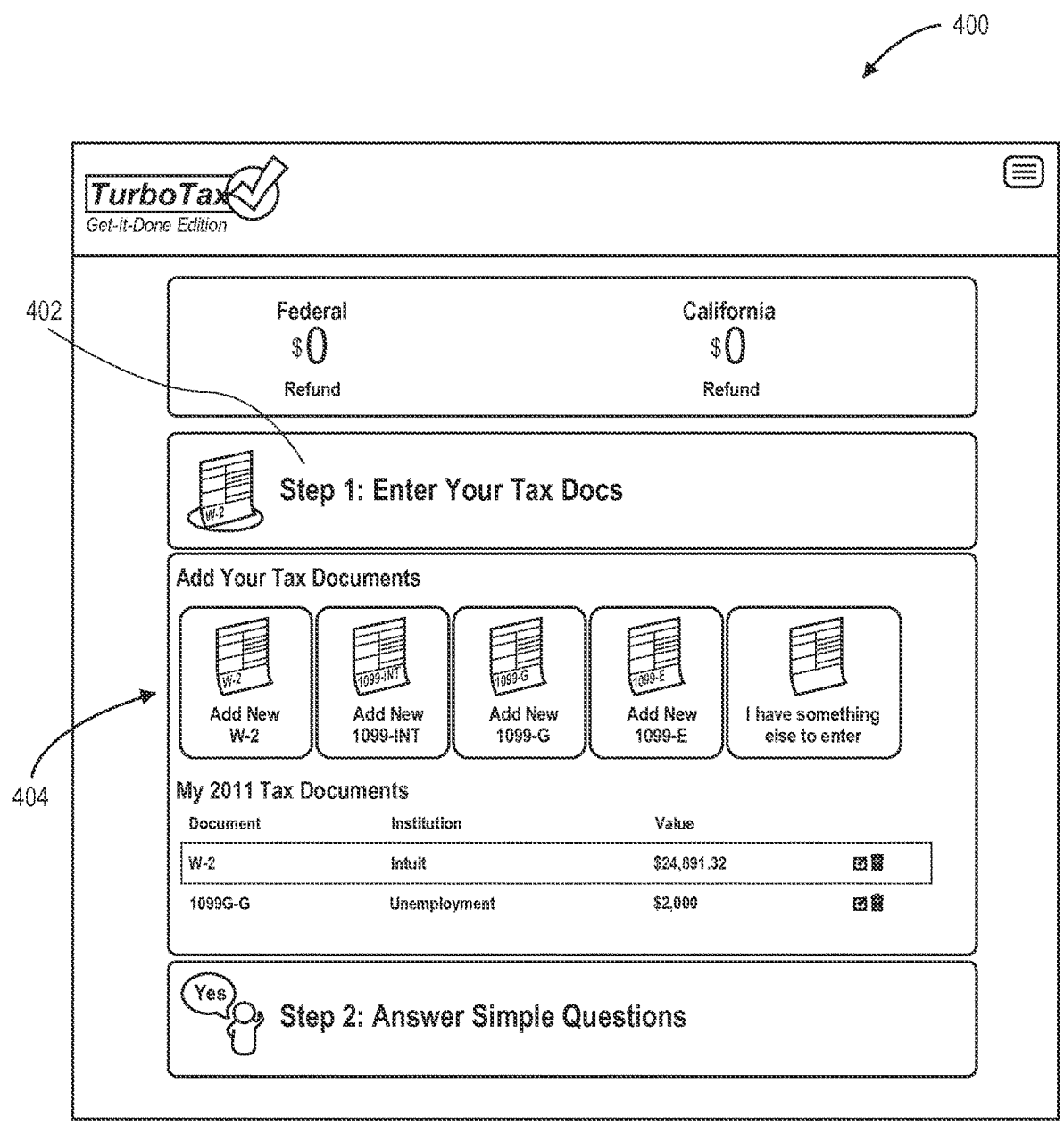
FIG. 4 is an example of a screen shot generated by an on-line tax preparation application according to embodiments for identifying types of documents containing data to be added to an electronic tax return.
Figure 5:
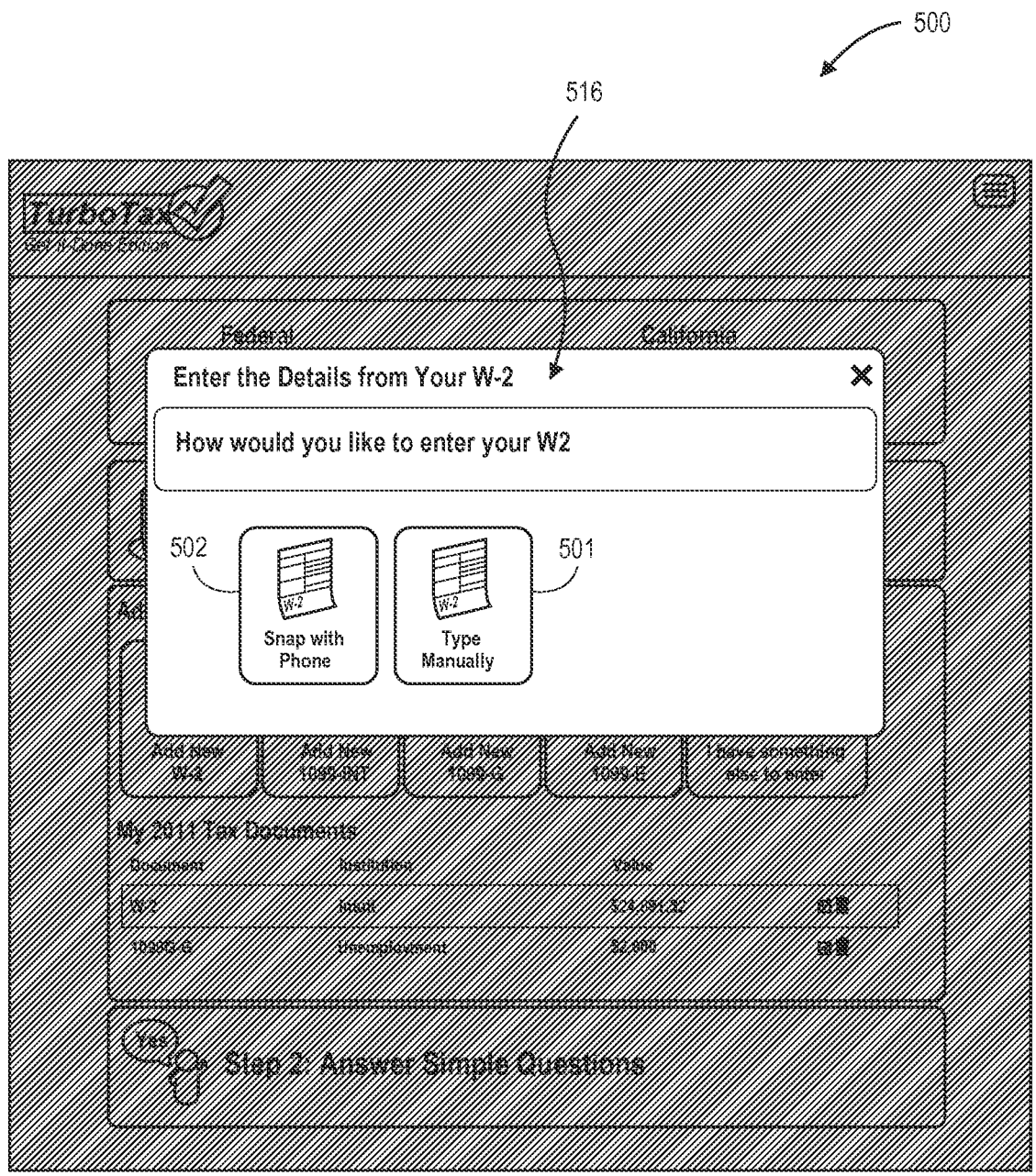
FIG. 5 is an example of a screen shot generated by an on-line tax preparation application according to embodiments for presenting the taxpayer with options for entering tax document data manually or by utilizing a second computing apparatus in the form of a mobile communication device according to embodiments.

Referring to FIGS. 3-5, in a method according to one embodiment for acquiring and processing an image of a tax document 216 for preparing at least a portion of an electronic tax return 214 comprises, at 302, the taxpayer 215 executing the browser 212 on the first computing apparatus 210 (such as a desktop computer) to access the first computer 230 or on-line tax preparation application 232, and at 304, the on-line tax preparation application 232 is launched to begin preparation of the electronic tax return 214. FIG. 4 illustrates an example of an interview screen 400 generated by the on-line tax preparation application 232 for "Step 1: Enter Your Tax Docs" 402 and listing 404 types of tax documents that may be selected by the taxpayer 215.

Referring again to FIG. 3, at 306, when beginning preparation of the electronic tax return 214, or during preparation of the electronic tax return 214 (e.g., when the taxpayer 215 has selected a tax document 216 to enter), the taxpayer 215 is presented with options for how to enter tax return data for that selected tax document 216. For example, as shown in FIG. 5, the taxpayer 215 has selected Form W2 516, and the interview screen 500 generated by the on-line tax preparation application 232 provides the taxpayer 215 with a first option or icon 501 that can be selected 501 to enter the Form W2 data manually ("Type Manually"), and a second option or icon 502 that can be selected to enter Form W2 data by imaging the form ("Snap with Phone").

Figure 6:
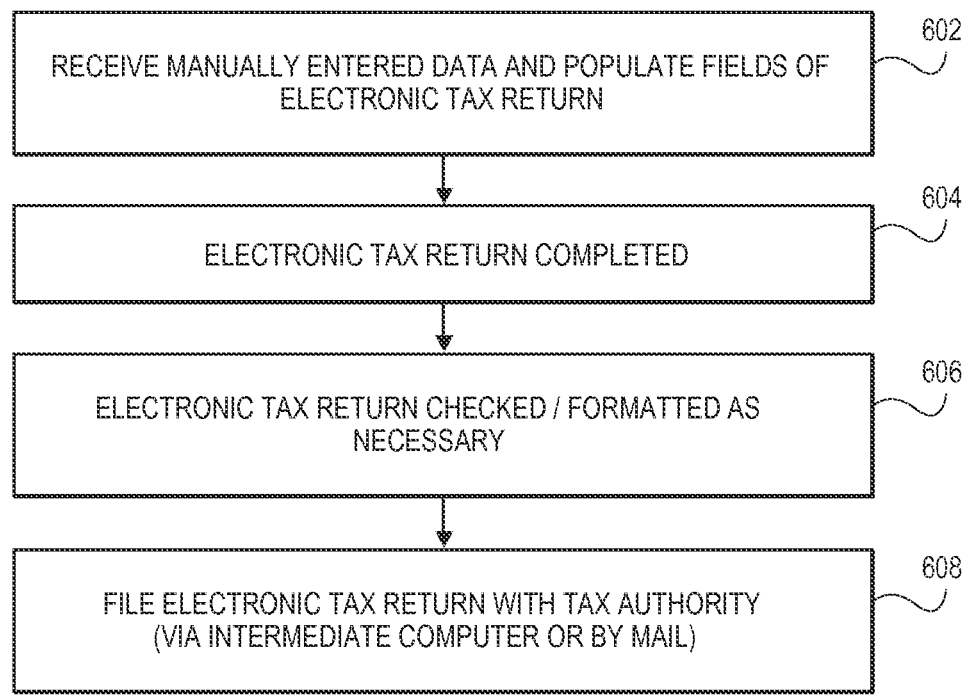
FIG. 6 illustrates a method for preparing, completing and filing a tax return completed with manual data entry.

Referring to FIG. 6, when the taxpayer 215 selects standard manual entry 501 at steps 602-608, the taxpayer 215 proceeds with standard manual entry or typing of data that is received by on-line tax preparation application 232, which populates fields of electronic tax return 214. The electronic tax return 214 is eventually completed, checked, formatted as necessary, and filed with a tax authority via the first computer 230 as an electronic filing server or by printing and mailing the tax return to the tax authority.

Figure 7:
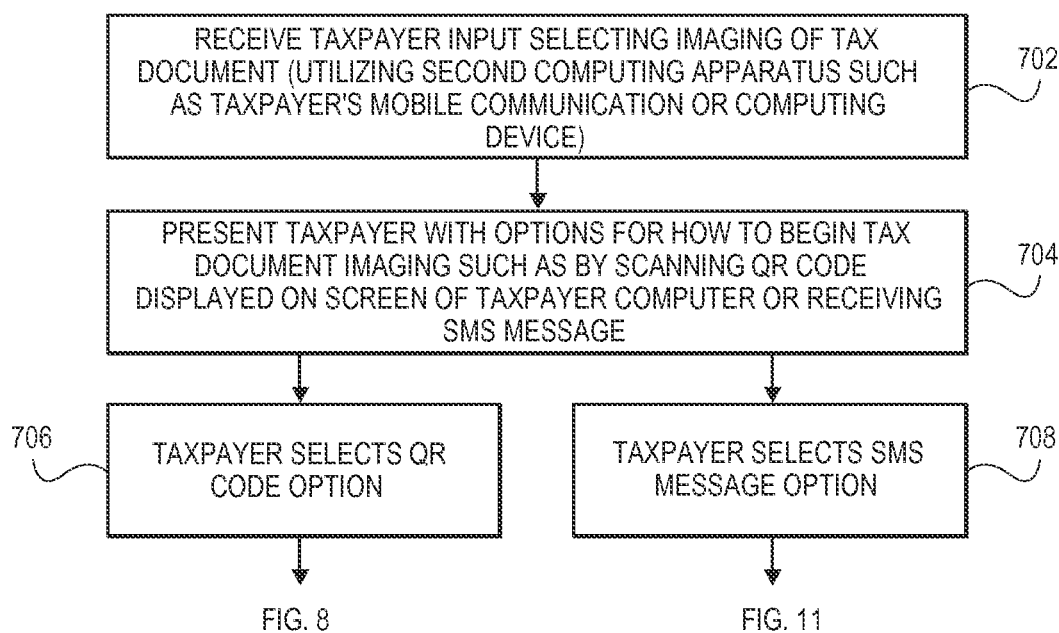
FIG. 7 illustrates a method for presenting data entry options to a taxpayer utilizing an on-line tax preparation application, and the options including imaging a tax document utilizing a QR code and a SMS message.

Referring again to FIG. 5, and with further reference to FIG. 7, in a method according to one embodiment, when the taxpayer 215 selects "Snap with Phone" 502 for entry by imaging a tax document 216, at 702, the on-line tax preparation application 232 or authentication data generator 233 receives taxpayer input selecting imaging of tax document 216 (e.g., Form W-2). At 704, the on-line tax preparation application 232 presents the taxpayer 215 with options for how to begin tax document 216 imaging. In the illustrated embodiment, the taxpayer 215 is presented with options for imaging a tax document 216 involving scanning a QR code or other code or matrix displayed on the screen 218 of the first computing apparatus 210, or receiving a SMS message at a different, second computing apparatus 220.

Figure 8:
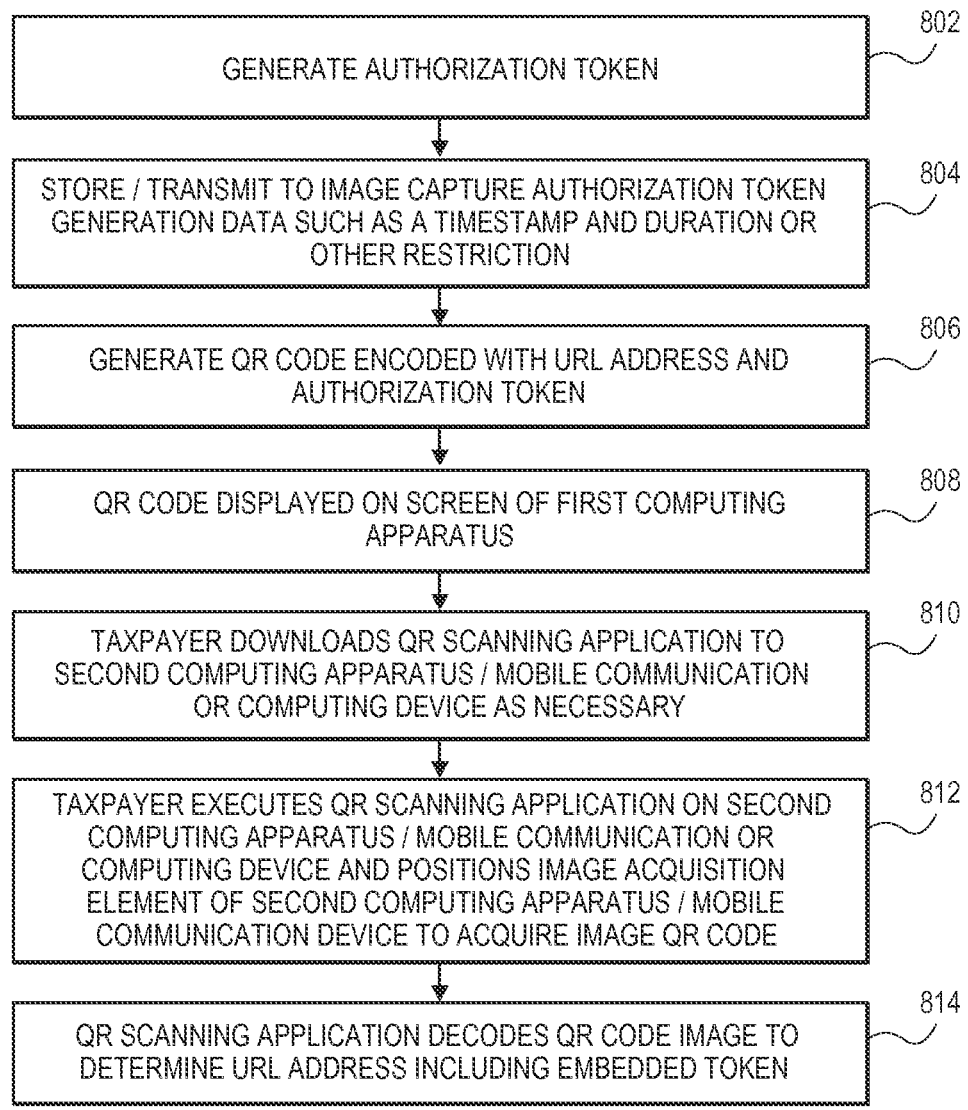
FIG. 8 illustrates a method for generating and processing a QR code encoded with a URL address of an intermediate image processing computer and embodying an authentication token according to one embodiment.

With continuing reference to FIGS. 7-8, according to one embodiment, at 706, the taxpayer 215 has selected the option involving imaging a tax document 216 utilizing a QR code. Referring to FIG. 8, in a method according to one embodiment, at 802, the on-line tax preparation application 232, or authentication data generator 233 thereof, generates authorization data such as a token 234 in response to the taxpayer's request to image a tax document 216. At 804, the token 234 may be associated with a time or use restriction, and the token generator 233 determines and stores or records restriction data such as data when the token 234 was generated, how long the token 234 is valid, and use restrictions (e.g., whether the token is a single or multi-use token). This data is stored to a data store 231 of the first computer 230 as necessary and transmitted by the host computer 230 to the intermediate computer 240 for subsequent token data analysis if such data is not encoded within or transmitted with the token 234.

At 806, in response to the taxpayer 215 selecting imaging by scanning of a QR code, the authentication data generator 233 encodes the generated token 234 and Uniform Resource Locator (URL) address 248 of the intermediate computer 240 into a QR code, matrix or other code. For ease of explanation, reference is made to a QR code 238.

Figure 9:
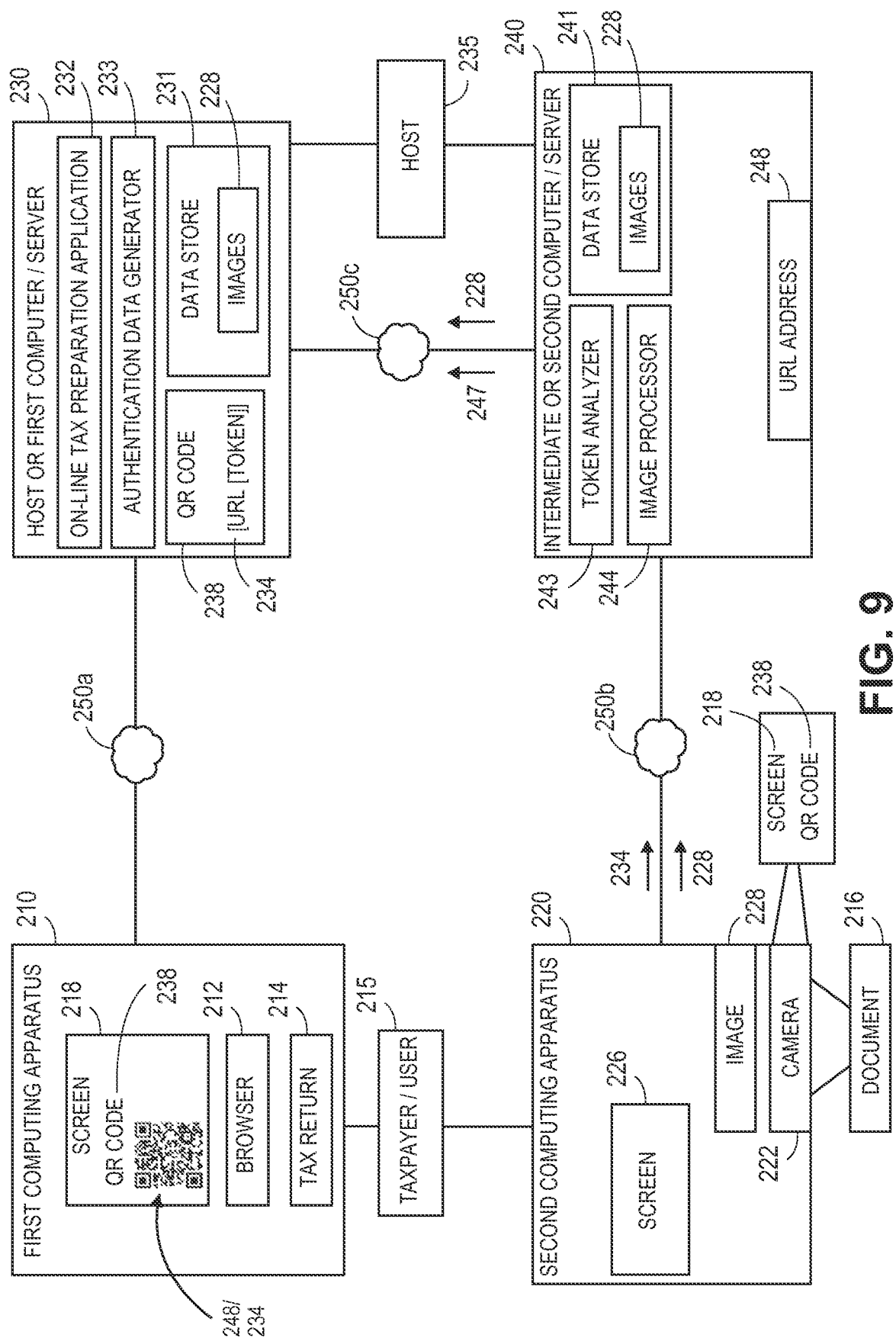
FIG. 9 is a block diagram illustrating a system constructed according to embodiment or involving components for acquiring and processing an image of a tax document utilizing a QR code in which the QR code is displayed on a screen of a first computing apparatus and photographed with an image capture element of a different computing apparatus.
Figure 10:
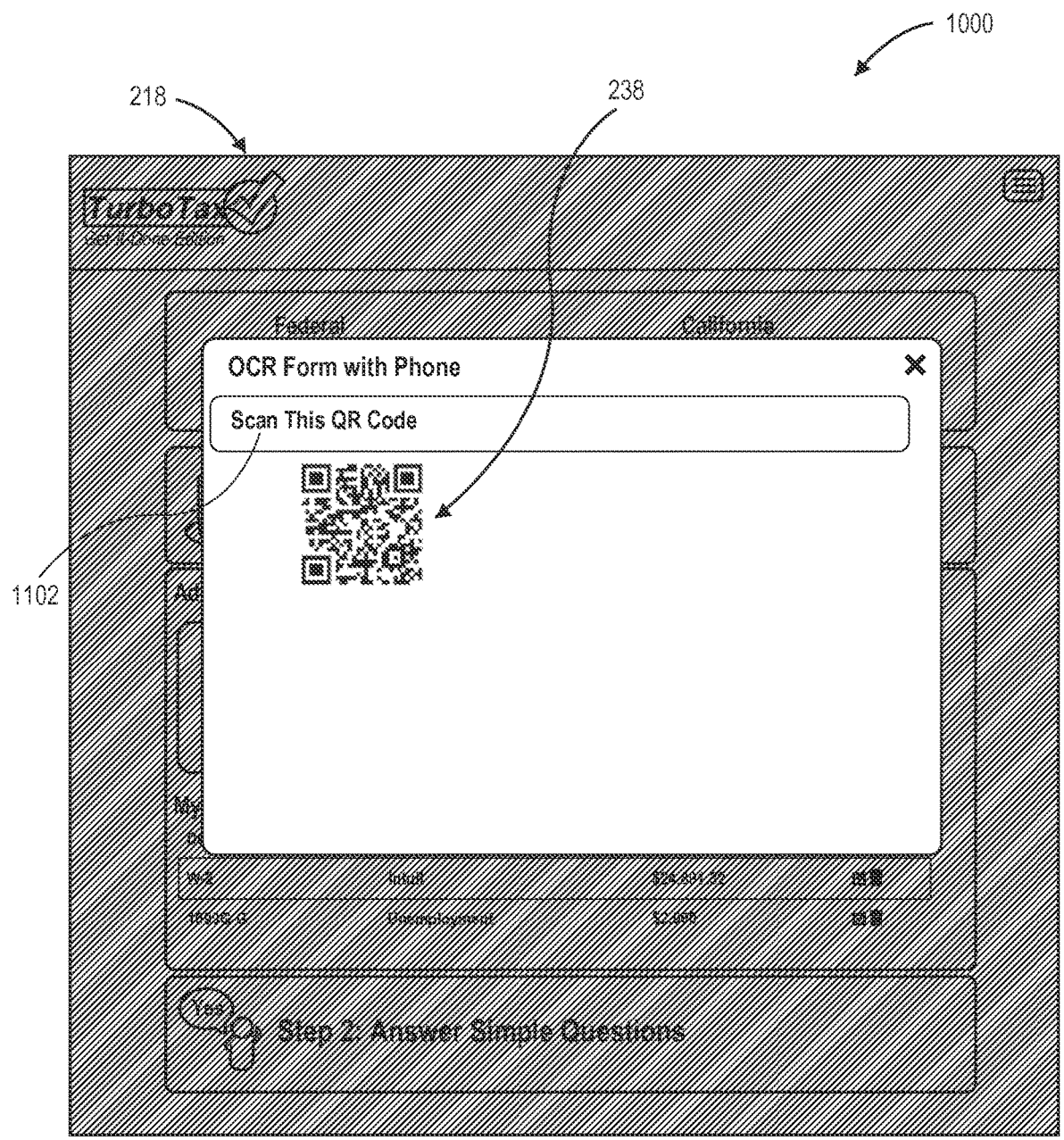
FIG. 10 is an example of a screen shot generated by an on-line tax preparation application according to embodiments for presenting a QR code encoded with a URL address of an intermediate computer and an authentication token to the taxpayer through the on-line tax preparation application and displayed on a screen of a first computing apparatus utilized to prepare the electronic tax return.

At 808, and with further reference to FIGS. 9-10, the on-line tax preparation application 232 processes the QR code 238 such that the QR code 238 is displayed on a screen 218 of the first computing apparatus 210. As shown in FIG. 9, according to one embodiment, the system configuration involves the QR code 238 being presented to the taxpayer 215 through the screen 218 of the first computing apparatus 210 (such that there is no network connection shown between the first computer 230 and the second computing apparatus 220). As shown in FIG. 10, the QR code 238 that was generated is presented or displayed to the taxpayer 215, and in the illustrated example, the interview screen 1000 displays the QR code 238 and provides instructions to the taxpayer 215 to "Scan this QR Code" 1002.

Referring again to FIG. 8, at 810, if necessary, the taxpayer 215 downloads a QR scanning application to the second computing apparatus 220, and at 812, the QR scanning application is launched to execute on the second computing apparatus 220 to read, decode or scan the QR code 238. At 814, a URL address 248 including the embedded token 234 is determined from reading, decoding or scanning the QR code 238.

Figure 11:
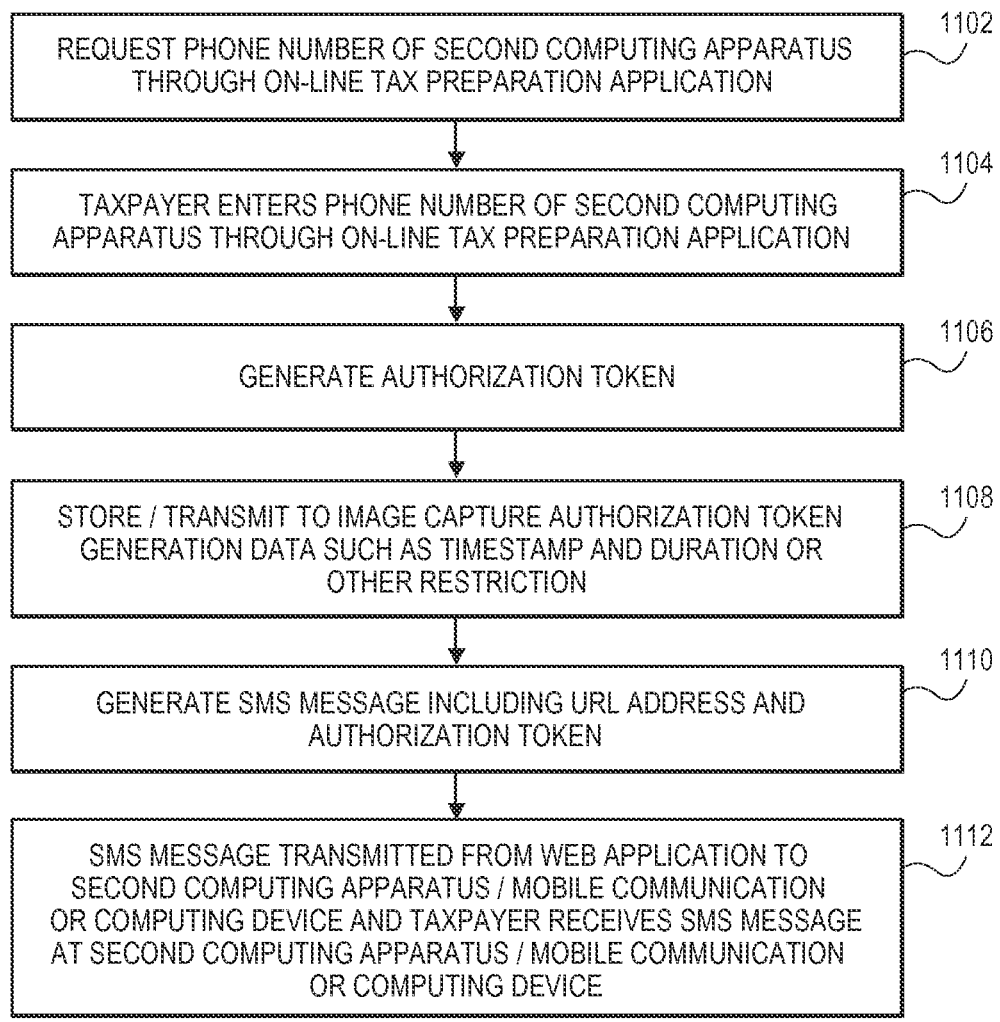
FIG. 11 illustrates a method for generating and processing a SMS message including a URL address of an intermediate image processing computer and embodying an authentication token according to one embodiment.
Figure 12:
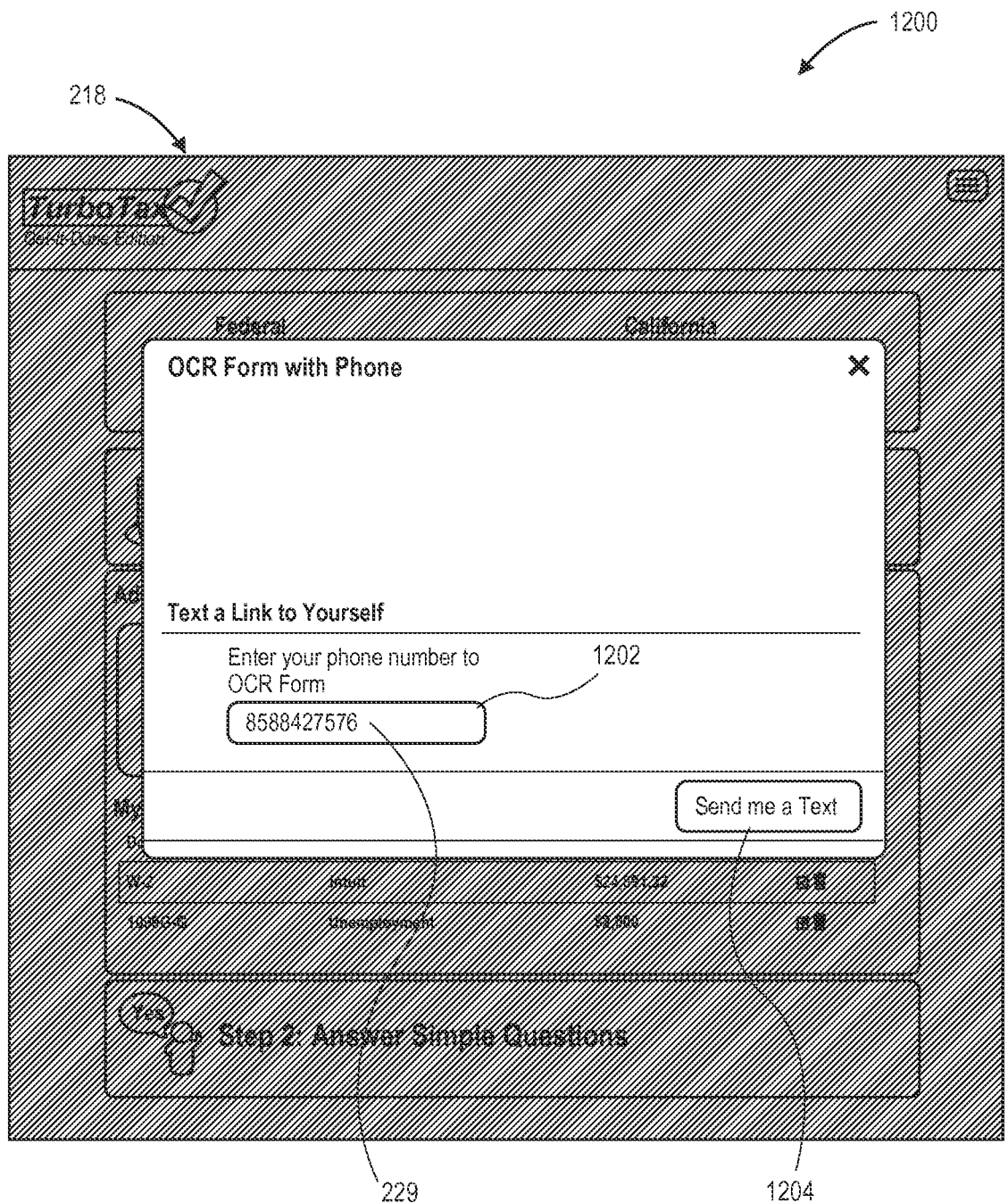
FIG. 12 is an example of a screen shot generated by an on-line tax preparation application according to embodiments for requesting that a SMS message including a URL address of an intermediate computer and an authentication token be transmitted to a second computing apparatus.

Referring again to FIGS. 5 and 7 and with further reference to FIGS. 11-12, in a method according to another embodiment, the taxpayer 215 selects "Snap with Phone" 502 and at 708, the taxpayer 215 has selected the option 708 involving imaging a tax document 216 utilizing a SMS message. Referring to FIGS. 11-12, in a method according to one embodiment, in response to the taxpayer 215 requesting use of a SMS message, at 1102, the on-line tax preparation application 232 or authentication data generator 233 generates an interview screen 1200 including a field or request 1202 for the phone number 229 of second computing apparatus 220. This screen 1200 is viewed by the taxpayer 215 through the screen 218 of the first computing apparatus 210 utilized to access the on-line tax preparation application 232 and prepare the electronic tax return 214. At 1104, in response, the taxpayer 215 enters the phone number 229 of the second computing apparatus 220 into the field 1202 and transmits the phone number 229 from the first computing apparatus 210 to the host computer 230 by pressing the "Send me a text" button 1204 as shown in FIG. 12.

With continuing reference to FIG. 11, at 1106-1108, as discussed above, the on-line tax preparation application 232 or authorization data generator 233 generates authorization data such as a token 234 in response to the taxpayer's request for a text or SMS message to image a tax document 216. For tokens 234 associated with time or use restrictions, as necessary, the authentication data generator 233 determines and stores or records restriction data such as data when the token 234 was generated, how long the token 234 is valid, and applicable use restrictions (e.g., whether the token 234 is a single or multi-use token). This data may be stored to a data store 231 of the first computer 230 as necessary and transmitted to the intermediate computer 240 for subsequent token data analysis if the token 244 does not include or is not transmitted with such information when the intermediate computer 240 is requested to process an image of a tax document 216.

Figure 13:
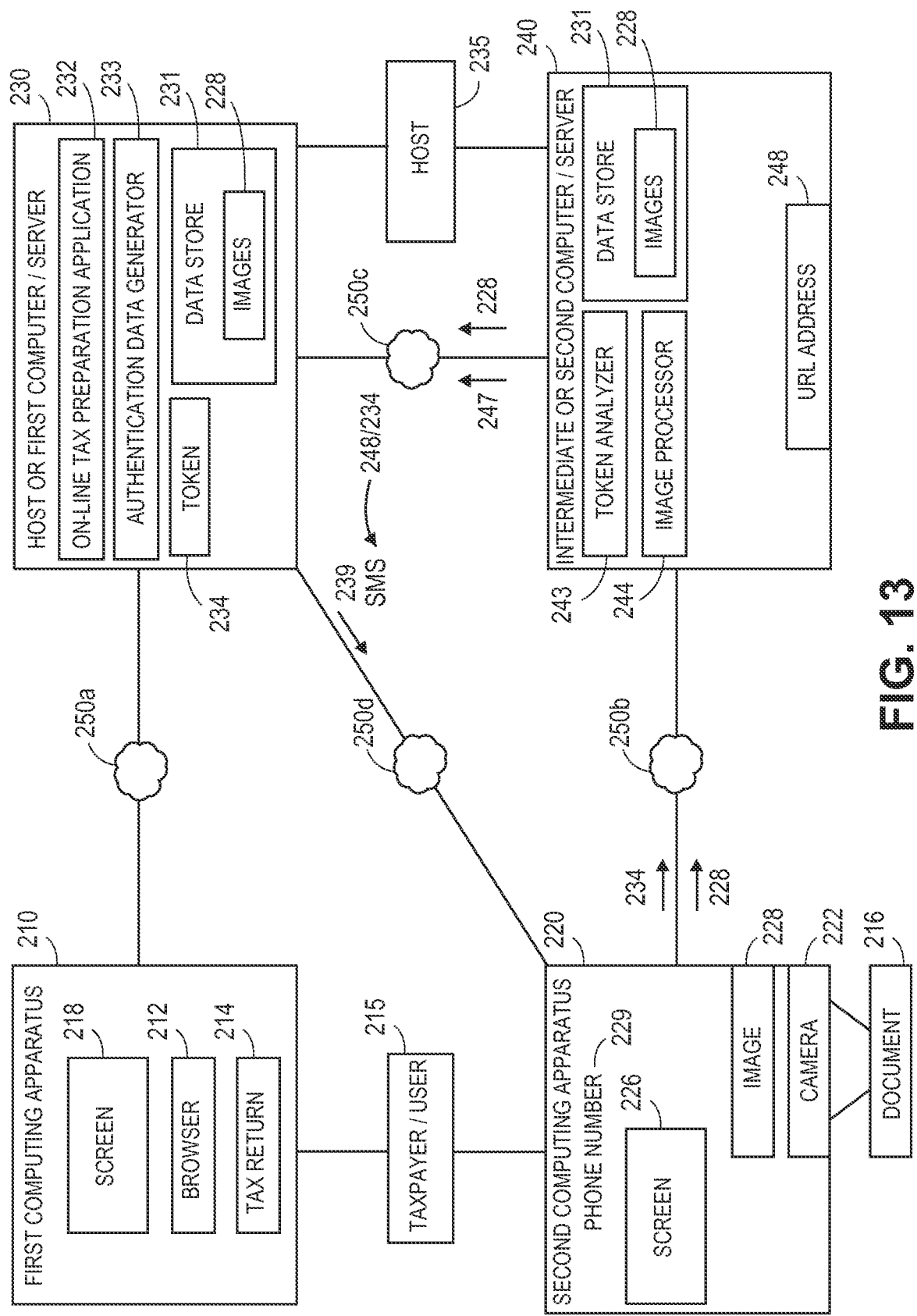
FIG. 13 is a block diagram illustrating a system constructed according to embodiment or involving components for acquiring and processing an image of a tax document utilizing a SMS message transmitted from a first or host computer to a second computing apparatus different than a first computing apparatus that is utilized to prepare an electronic tax return utilizing the on-line tax preparation application.

At 1110, and with further reference to FIG. 13, in response to the taxpayer 215 selecting tax data entry by imaging involving a SMS message, the authentication data generator 234 generates a SMS message 239 including URL address 248 of the second computer 240 and embodying the generated token 244, and at 1112, the SMS message 239 is transmitted from the first computer or 230 web application server to the second computing apparatus 220 (in the current example, a mobile communication or computing device such as a smartphone or tablet). The taxpayer 215 receives the SMS message 239 including the URL address 248 embodying the token 234 at the second computing apparatus 220/mobile communication or computing device, rather than at the first computing apparatus 210 used to prepare the electronic return 214 as shown in FIG. 13. In FIG. 13, the system embodiment is shown as including a network connection 250d between the host computer 230 and the second computing apparatus 220 for purposes of transmitting the SMS message 239 to the taxpayer 215, whereas in the embodiment illustrated in FIG. 9, this is not the case. Thus, FIG. 2 is intended to show how a system may be configured to implement embodiments involving QR codes 238 and/or SMS messages 239).

While FIGS. 9 and 13 illustrate initial transmission or presentation of an electronic message or data to different computing apparatus (a QR code 238 being displayed on a screen 218 of the first computing apparatus 210, and a SMS message 239 being sent to the second computing apparatus 220), the second computing apparatus 220 eventually receives or determines the URL address 248 embodying the token 234. Further, while certain embodiments are described with reference to a SMS message 239, other messages such as an electronic mail message including a link to the URL address 248 embodying the token 244 may be sent from the host computer 230 to the second computing apparatus 220. Moreover, while embodiments are described with reference to a QR code 238 being displayed on the first computing apparatus 210 screen and then being imaged and processed using the second computing apparatus 220, in another embodiment, a SMS or e-mail message including the QR code 238 may be initially transmitted from the host computer 230 to the second computing apparatus 220 and subsequently processed, e.g., printed and scanned by the second computing apparatus 220. Thus, it will be understood that the second computing apparatus 220 can receive or determine the URL address 248 embodying the token 244 in different ways, and that figures are provided to show examples of how embodiments may be implemented.

Figure 14:
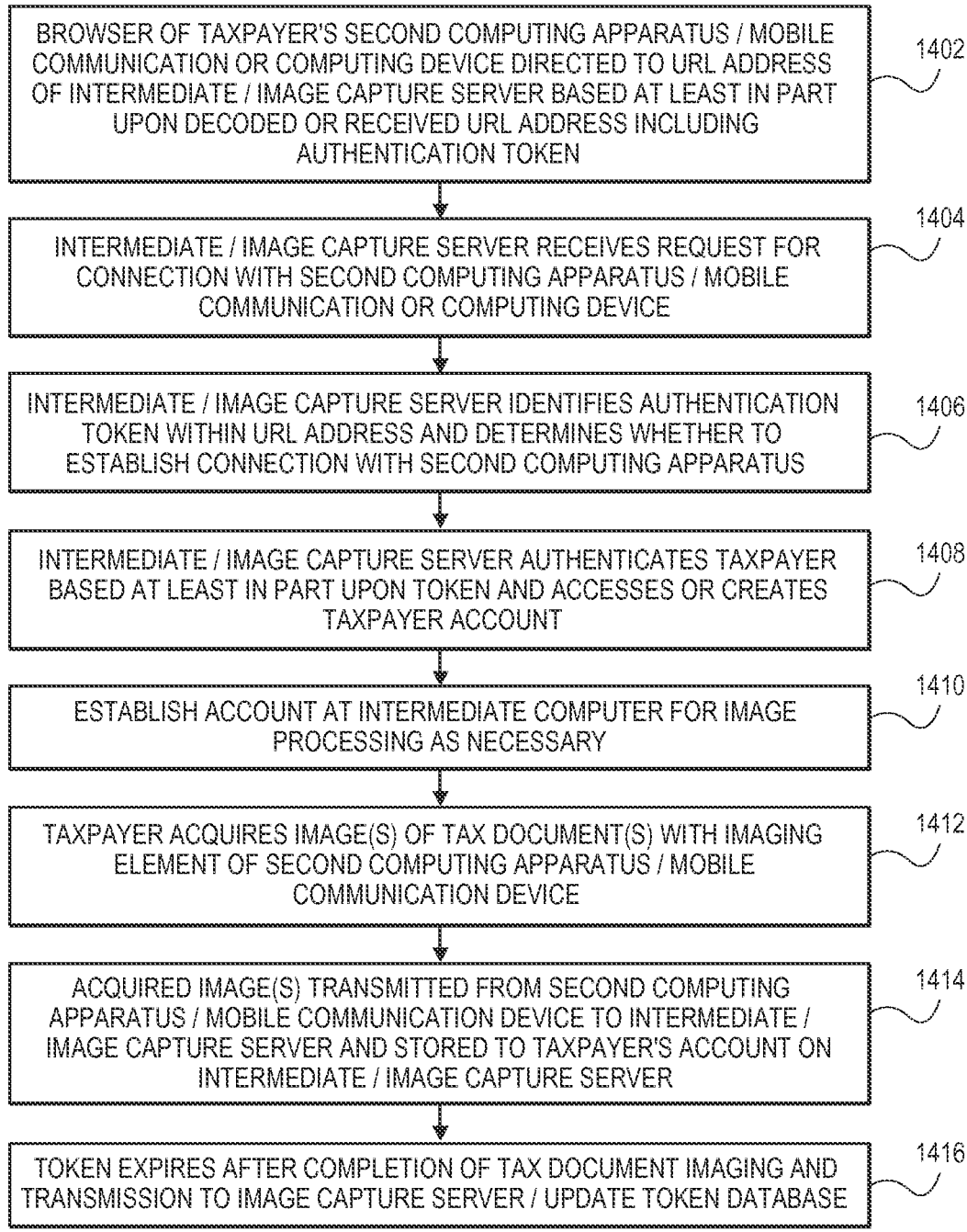
FIG. 14 illustrates a method for authenticating a second computing apparatus that is utilized to acquire images of a tax document and processing the image to determine tax data within the image.

Referring to FIG. 14, after the URL address 248 embodying the token 244 has been received and processed as necessary, at 1402, the URL address 248 is selected or input into a browser of the taxpayer's second computing apparatus 220/mobile communication or computing device such that the second computing apparatus 220 is directed to the intermediate computer 240 for purposes of capturing images of tax documents 216. At 1404, the intermediate computer 240 receives the request by the second computing apparatus 220, and at 1406, analyzes the token 234 within the URL address 248 to determine whether to authenticate the second computing apparatus 220 and establish the connection.

For example, as described above, when the token 234 was generated, restriction or limitation data was embodied within the token 234, transmitted with the token 234 or transmitted by the host computer 230 to the intermediate computer 240 such that the intermediate computer receives or stores restriction data of the tokens 234 generated by the first computer 230 and that are available for use to upload tax document images.

Figure 15:
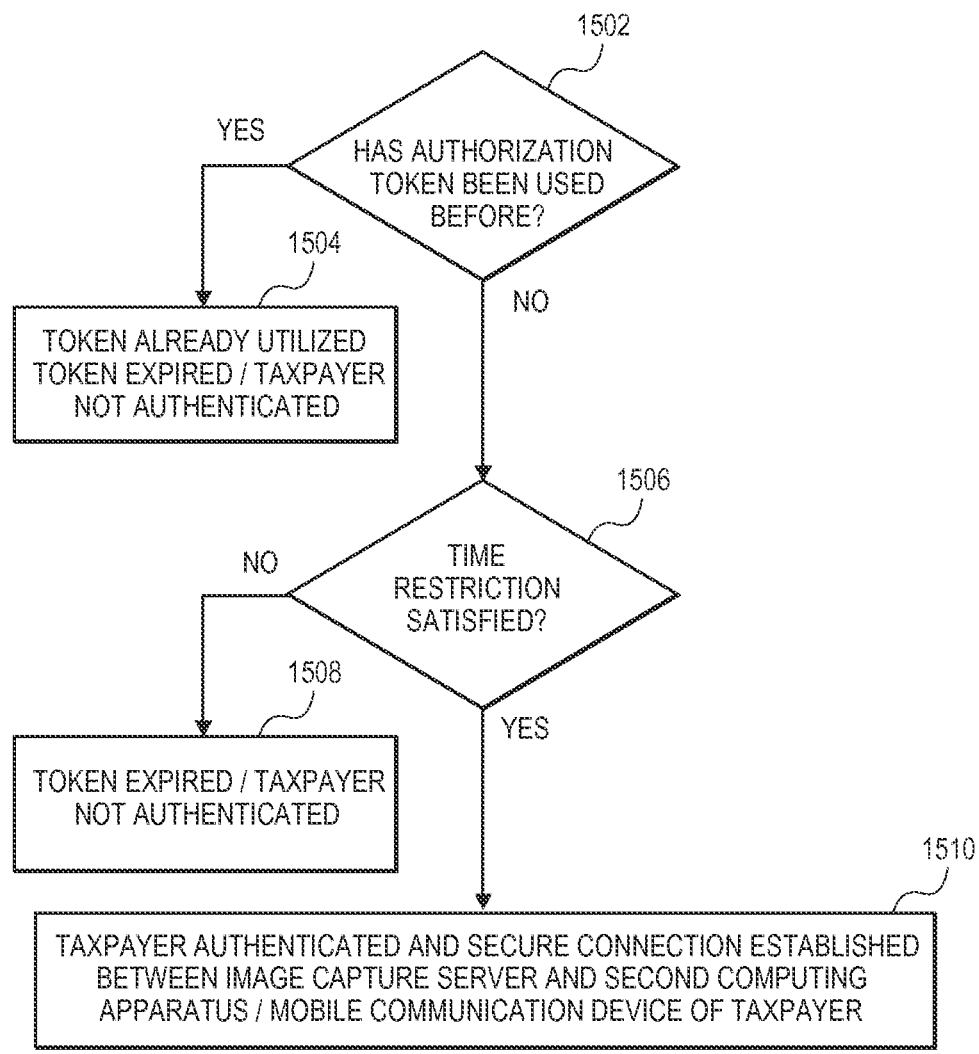
FIG. 15 illustrates a method for determining whether authentication data is valid for purposes of establishing a secure connection between a second computing apparatus such as mobile communication or computing device and the intermediate computer.

Thus, referring to FIG. 15, in a method according to one embodiment involving an example of a single use token 234, the intermediate computer 240 determines at 1502, e.g., utilizing a token analyzer 243, whether the token 234 been used before. If so, then at 1504, the single use token 234 has already expired according to the restriction or rule, and the second computing apparatus 220 is not authenticated such that the taxpayer 215 will need to request a new token using the first computing apparatus 210 or enter tax data in a different way. Otherwise, if the single-use token 234 has not been used before, then at 1506, the intermediate computer 240 determines whether any time restriction applies. For example, the token generator 233 may have specified that the token 234 is a single-use token valid for 48 hours. If a specified time has already passed, then at 1508, the single use and time restricted token 234 has already expired, and the second computing apparatus 220 is not authenticated such that the taxpayer 215 will need to request a new token using the first computing apparatus 210 or enter tax data in a different way. It will be understood that different types and combinations of token restrictions or rules may be utilized.

Otherwise, with further reference to FIG. 14, assuming the token 234 is still valid in view of any use and/or time restrictions, at 1408/1510, the token analyzer 243 authenticates the second computing apparatus 220, establishes a connection (e.g., SSL connection) and accesses or establishes a taxpayer account for processing of images 228 and storage of images to the data store 241 as necessary at 1410.

Figure 16:
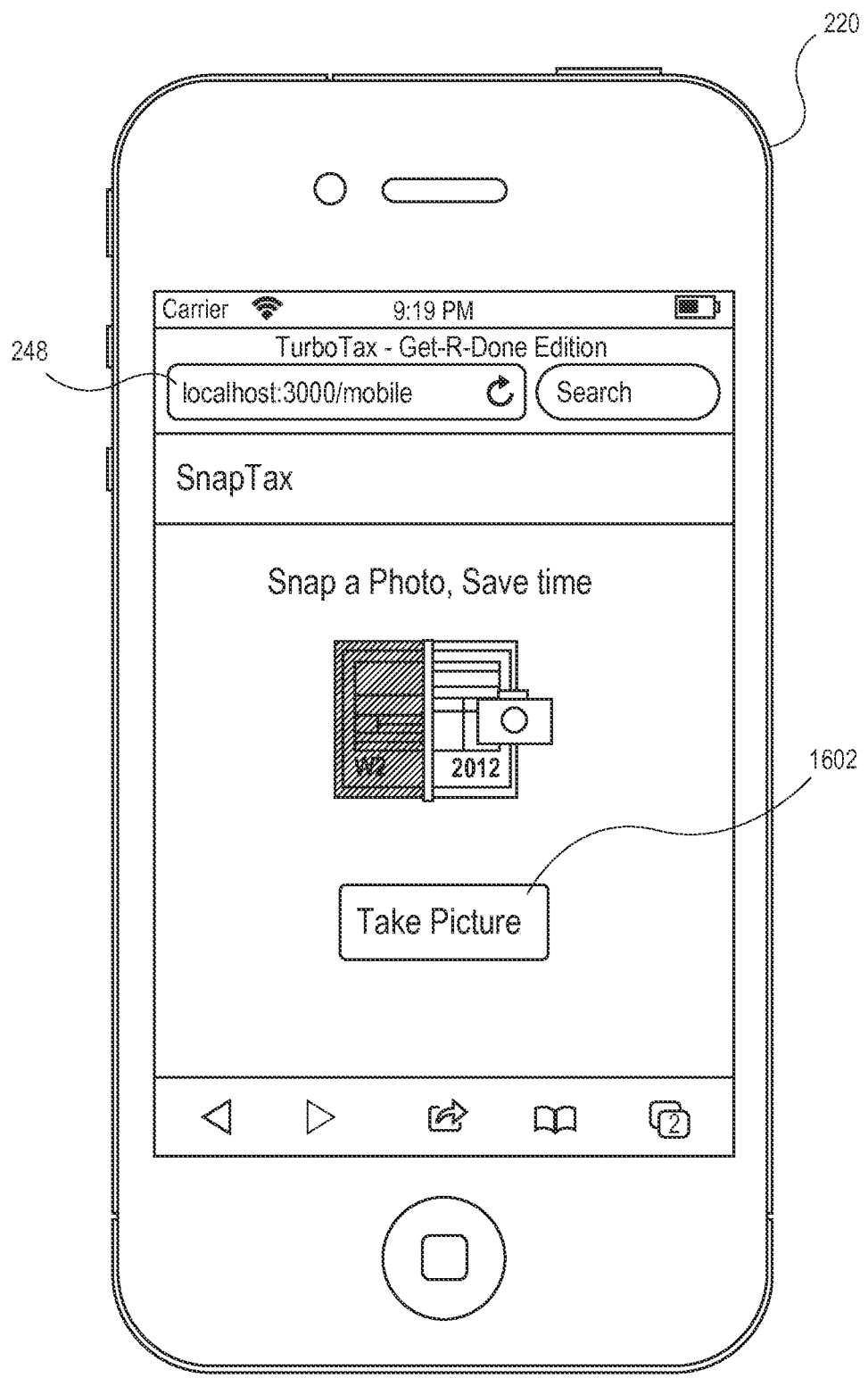
FIG. 16 is an example of a screen shot generated by an image processor of an intermediate computer and instructing a taxpayer to acquire an image of a tax document utilizing a mobile communication device after the mobile communication device has been authenticated.

Continuing with reference to FIG. 14, and with further reference to FIG. 16, at 1412, an image processing program 244 generates one or more interface or screen 1600 instructing the taxpayer 215 to snap a photo of a tax document 216 to be imaged, and the taxpayer 215 proceeds with acquiring image(s) of the tax document(s) using the second computing apparatus 220 at 1410, e.g., by pressing the "Take Picture" button 1602 within the screen 1600, aligning the tax document 216 with the camera 222 of the second computing apparatus 220 as instructed in the screen 1600, and taking the picture of the tax document 216. The resulting image 228 acquired with the second computing apparatus 220 is securely transferred to the taxpayer account at the intermediate computer 240 at 1414 (also illustrated in FIG. 16 by URL address 248 on screen 226 of the second computing apparatus 220 in the form of a smartphone), and the image processing program 244 updates a table or database reflecting that the token 234 has been used for future reference by the token analyzer 243.

According to one embodiment, a token 234 may be utilized to establish a secure connection session during which the taxpayer 215 can repeat steps to acquire images 228 of multiple tax documents 216, and then the intermediate computer's table or database can be updated to reflect that the token 234 has been utilized after all images 228 have been uploaded. In other embodiments, the taxpayer 215 must request a new token 234 for each individual tax document 216 to be imaged.

With continuing reference to FIG. 17 and referring again to FIG. 2, at 1702, the image processing program 244 processes the tax document images 228, e.g., by performing image analysis or a recognition process such as OCR on the received image(s) 228. Various types of known OCR processing methods may be applied to the received images 228. Further OCR processing methods that may also be utilized are described in U.S. application Ser. No. 13/781,393, entitled SYSTEMS AND METHODS FOR TAX DATA CAPTURE AND USE filed on the same date herewith, the contents of which are incorporated herein by reference as though set forth in full, and which describes, for example, a method for acquiring tax data for use in tax preparation software or application that includes receiving or acquiring an image of at least one document containing tax data therein with an imaging device, extracting one or more features from the acquired image and comparing the extracted one or more features to a database containing a plurality of different tax forms utilizing a textual database and geometric database, and identifying or selecting a tax form corresponding to the at least one document from the plurality of different tax forms based at least in part on a confidence level associated with the comparison of the extracted one or more features to the database. This processing may applied to populate corresponding fields of an interview screen or form of an electronic tax return generated by the tax preparation software or application.

At 1704, after processing of the tax document image 228, the intermediate computer 240 transmits image processing results 247 to the host computer 230, and in certain embodiments, may also transmit the related images 228 to the host computer 230 for storage in data store 231. At 1706, the on-line tax preparation application 232 receives the image processing results 247 and imports respective data into respective fields of interview screens/electronic tax return 214, e.g., based on determining that the image 228 is an image of a particular tax document, determining a field or data structure of that document, and mapping that field or data structure to corresponding fields of the on-line tax preparation application 232.

Figure 17:
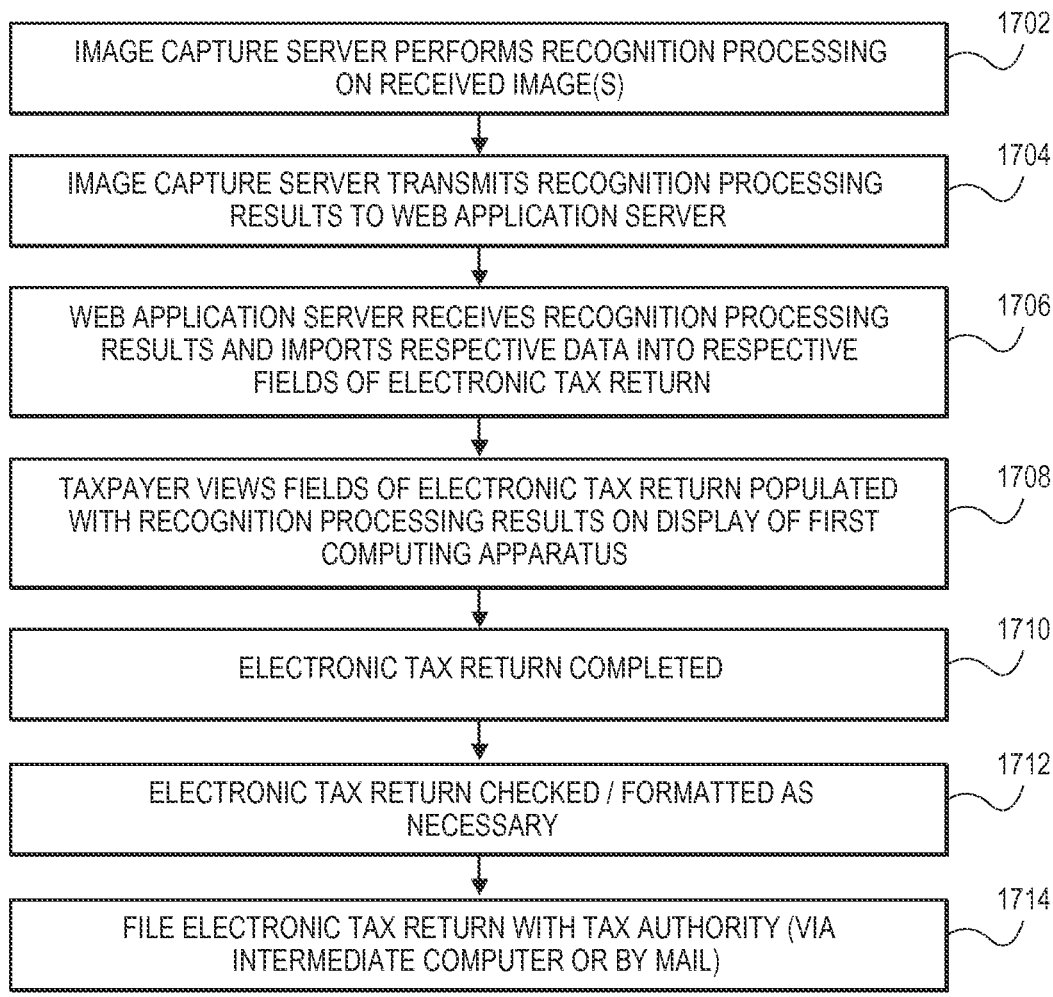
FIG. 17 illustrates a method for processing tax document images received at the intermediate computer and transmitting processing results to the host computer for integration into the electronic tax return being prepared.
Figure 18:
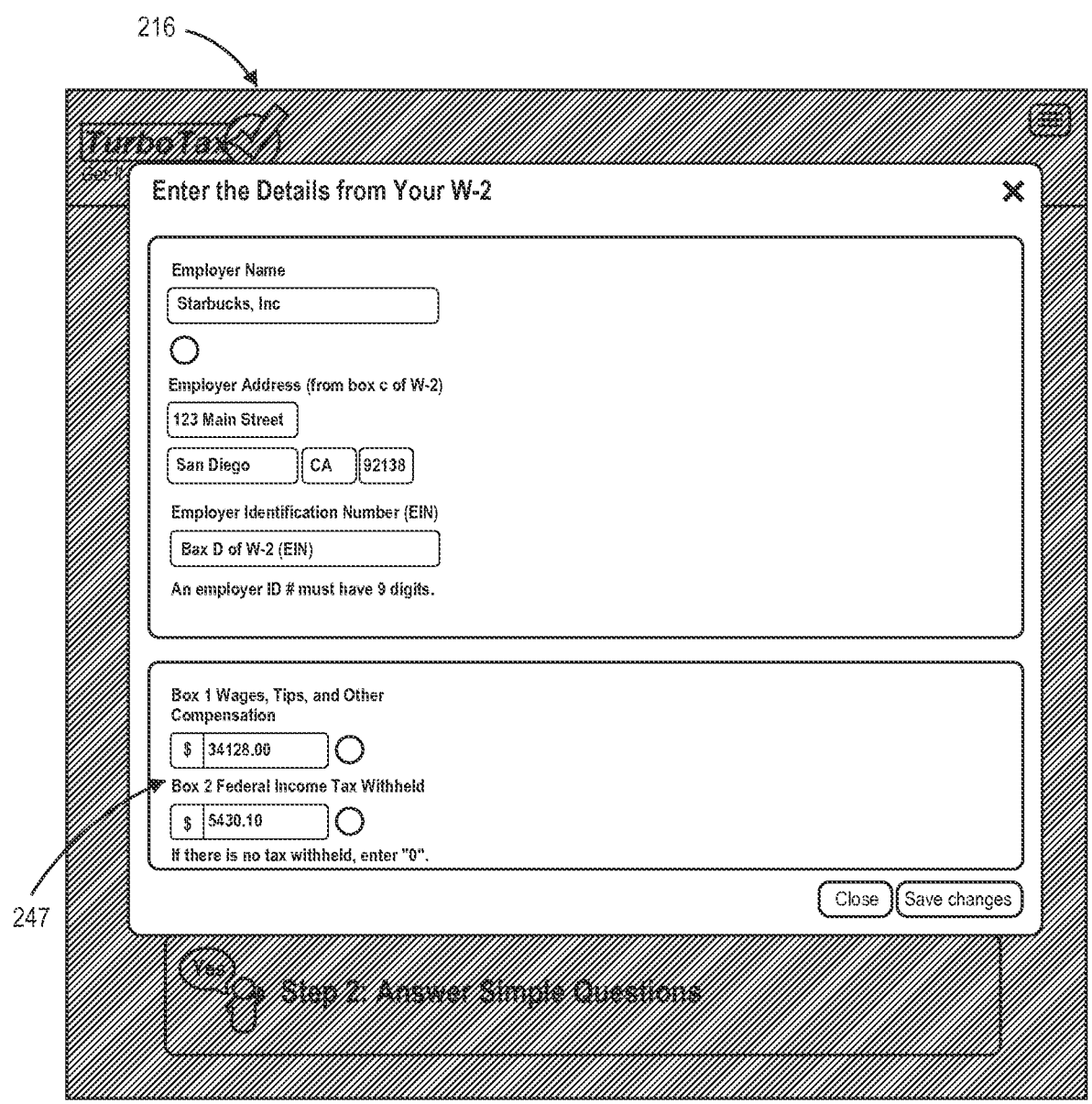
FIG. 18 is an example of a screen shot generated by the on-line tax preparation application illustrating an interview screen or section of an electronic tax return populate with data derived from an image acquired and processed according to embodiments.

With continuing reference to FIG. 17, and with further reference to FIG. 18, at 1708, the taxpayer 215 is then able to view tax data that was integrated into the electronic tax return 214 according to embodiments, e.g., as displayed on the screen 218 of the first computing apparatus 210 (e.g., desktop computer) executing the browser 212 to access the on-line tax preparation application 232 to prepare the electronic tax return 214. Thus, with embodiments, while the first computing apparatus 210 may be utilized to prepare the electronic tax return 214, a different, second computing apparatus 220 is utilized to acquire document images 228 and upload the images 228 to a different intermediate computer 240 for processing and importation into the electronic tax return 214 being prepared using the first computing apparatus 210.

At 1710, the electronic tax return 214 is eventually completed, and the on-line tax preparation application 232 checks and formats the electronic tax return 214 as necessary. The completed tax return 214 is then filed with a tax authority. The electronic tax return 214 may be filed electronically with the tax authority computer 250 by the host computer 230, or the taxpayer 215 may print and mail the tax return.

Tax Data Source Visualization Through Tax Preparaiton Application

Embodiments related to image processing and encoding of user interface elements for presenting an image or portion of an image of a source of tax data from within the tax preparation application are described with reference to FIGS. 19-36.

Figure 19:
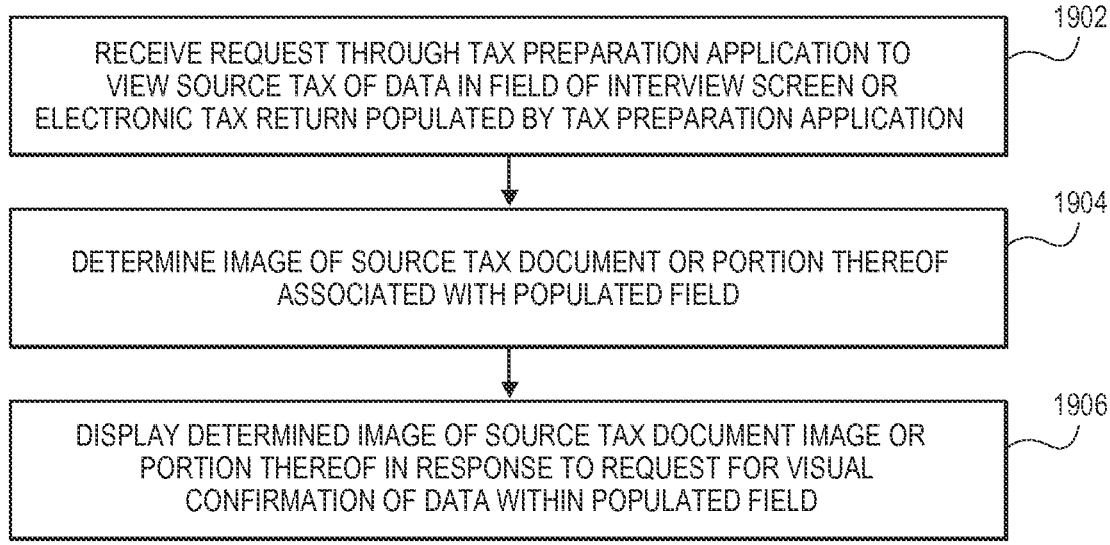
FIG. 19 illustrates one embodiment of a method for displaying an image of a source tax document or portion thereof through a tax preparation application in response to a request by a taxpayer or user of the tax preparation application.

Referring to FIG. 19, in an embodiment according to one embodiment, at 1902, a computer receives a request through a tax preparation application to view a source of tax data of a field of an interview screen or electronic tax return, and at 1904, determines or selects a portion of the image of source tax document associated with the field. At 1906, the computer displays the determined or selected portion of the image in response to the request.

Figure 20:
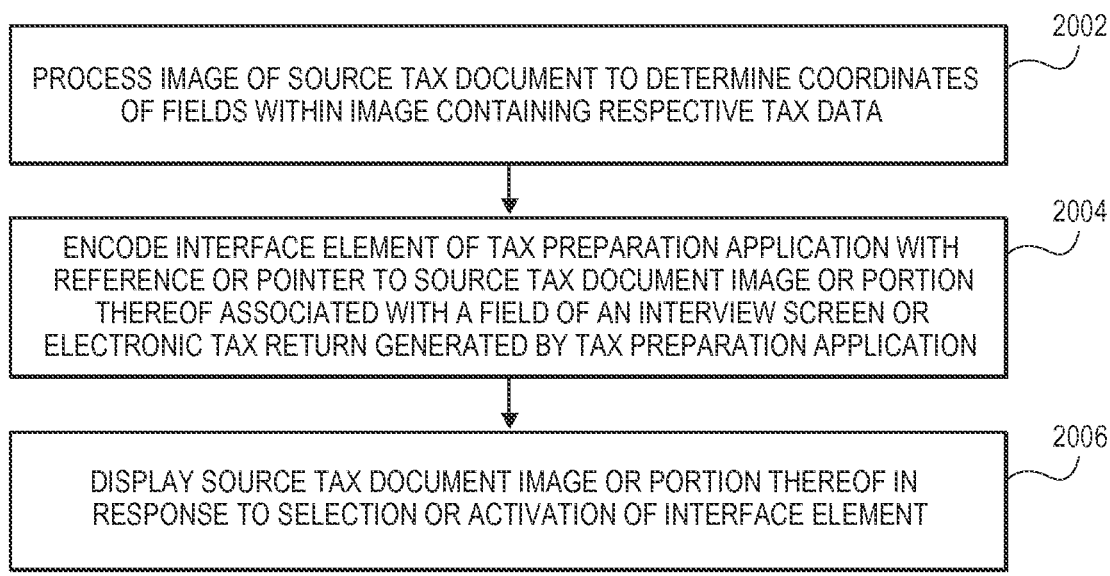
FIG. 20 illustrates one embodiment of a method for encoding a user interface element of a tax preparation application and displaying an image of a source tax document or portion thereof through the tax preparation application in response to a request by a taxpayer or user of the tax preparation application.
Figure 21:
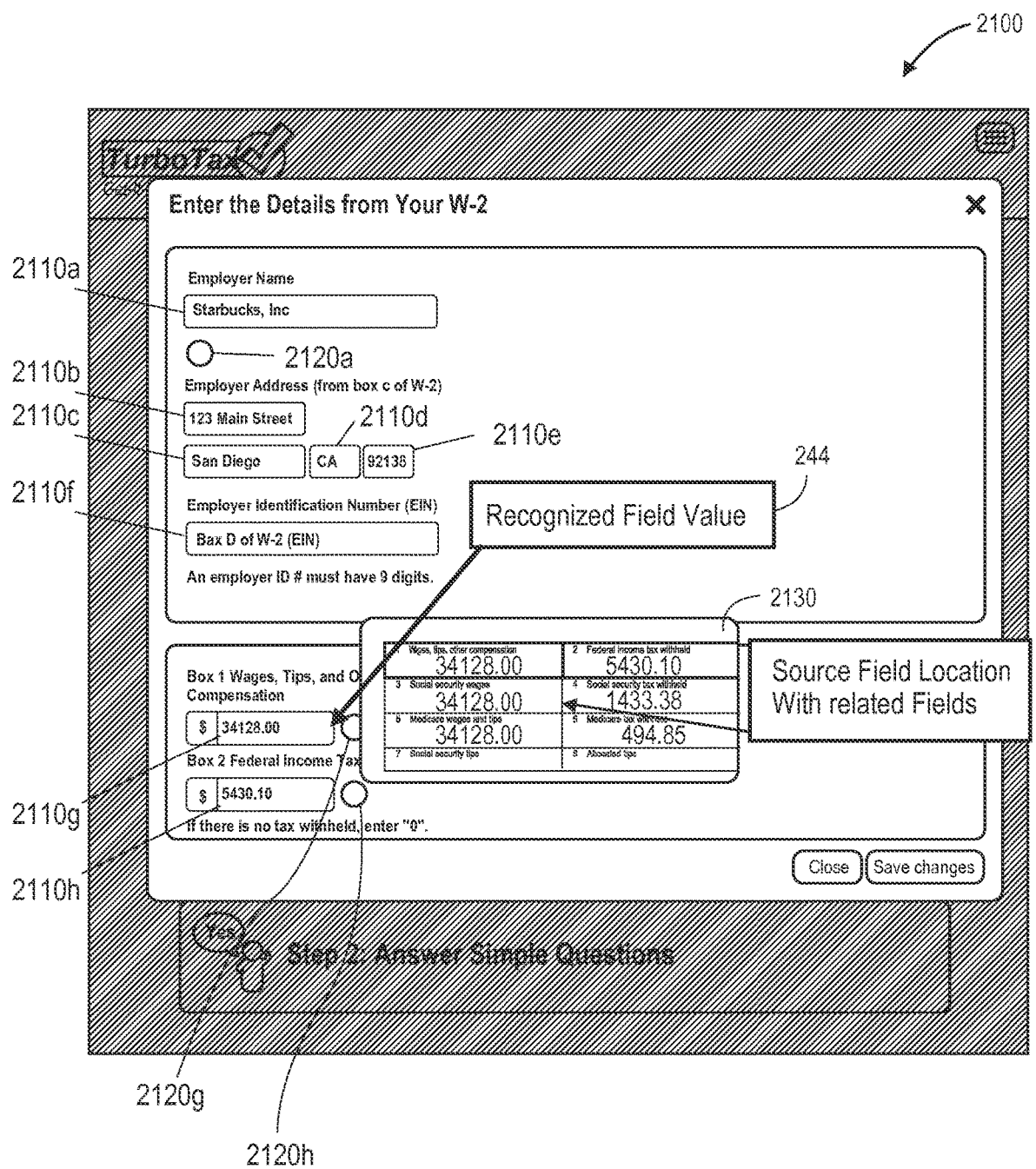
FIG. 21 is a screen shot showing one manner in which embodiments may be implemented to display a source tax document or portion thereof through the tax preparation application.

Referring to FIG. 20, according to another embodiment, at 2002, a computer (e.g., computer or computing apparatus 210, 220, 230) processes a received or required image of a tax document that is a source of tax data to determine coordinates of fields within the image. At 2004, a user interface (UI) element of and displayable by the tax preparation application is encoded with a reference or pointer to a portion of the image associated with a field of an interview screen or electronic tax return generated by tax preparation application. At 2006, the portion of the tax document that is the source of the tax data is accessed or retrieved for display to the taxpayer or user in response to selection or activation of interface element, such that the taxpayer or user can confirm data within the field of interview screen or electronic tax return generated by tax preparation application For example, referring to FIG. 21, the tax preparation application 232 has generated an interview screen 2100 for Form W-2 including fields 2110*a-h* (generally, field 2110) for employee name, address, employee identification number and Box 1 (Wages, Tips and Other Income) and Box 2 (Federal Income Tax Withheld). While FIG. 21 illustrates an interview screen 2100, embodiments may also involve a form of an electronic tax return generated by the tax preparation application 232 or other views, screens or forms generated by the tax preparation application 232.

In the illustrated embodiment, the fields 2110 have already been populated by the taxpayer 215 manually entering data or the data being transferred or imported from an electronic file or on a result of an imaging processing or recognition process and transferred or imported into respective fields 2110. Certain fields 2110*a*, 2110*g* and 2110*h* are associated with user interface elements 2120*a*, 2120*g* and 2120*h* (generally, UI element 2120) located in proximity or adjacent to corresponding fields 2110*a*, 2110*g* and 2110*h*.

In the illustrated embodiment, the taxpayer 215 has selected or activated the UI element 2120*g* associated with Form W-2, Box 1. In response, the tax preparation application 232 accesses an image 228 that is a source of tax data for that field, and in certain embodiments, determines or identifies the portion of the image 228 associated with that UI element 2120*g*, such that the image 228 or portion 228*p* ("p" referring to portion) thereof is displayed on the screen 218 through the tax preparation application 232. In the illustrated embodiment, wage data of $34,128 was transferred into the field 2110*g* following application of OCR or other image processing, and the tax preparation application 232 displays the portion 228*p* of the image (2130) of Form W-2 with a corresponding box (Box 1). With the populated field data and the image portion 2130 being displayed simultaneously, the taxpayer 215 can view the image portion 2130 of the source tax document 216 to confirm that the data determined by OCR or other image processing 244 and imported into that field 2110*g* can be verified or confirmed without having to locate or review the original paper version of the Form W-2 tax document 216.

In the illustrated embodiment, the selected portion 2130 of the image 228 that is displayed includes Box 1 and adjacent or surrounding Boxes 2-6 to provide context and other information for the taxpayer's reference, whereas in other embodiments, only a single box or field of the image 228 is selected and displayed for a direct field-to-box (image to interview screen) comparison. Further aspects of how images 228 are processed, image portions 228*p* are selected and displayed, and how UI elements 2120 are encoded are described in further detail below. While embodiments are described with reference to an interview screen 2100, in a tax preparation application 232 such as TURBO TAX tax preparation application available from Intuit Inc., the UI element 2120 may be presented within other displayed screens such as screens accessible through "Tools" for "My Tax Data," "Topic List," "Tax Summary," and through "View" for selection of various tax forms. Thus, for ease of explanation and not limitation, reference is made to an interview screen 2100 or other form generated by or accessed through the tax preparation application 232.

Figure 22:
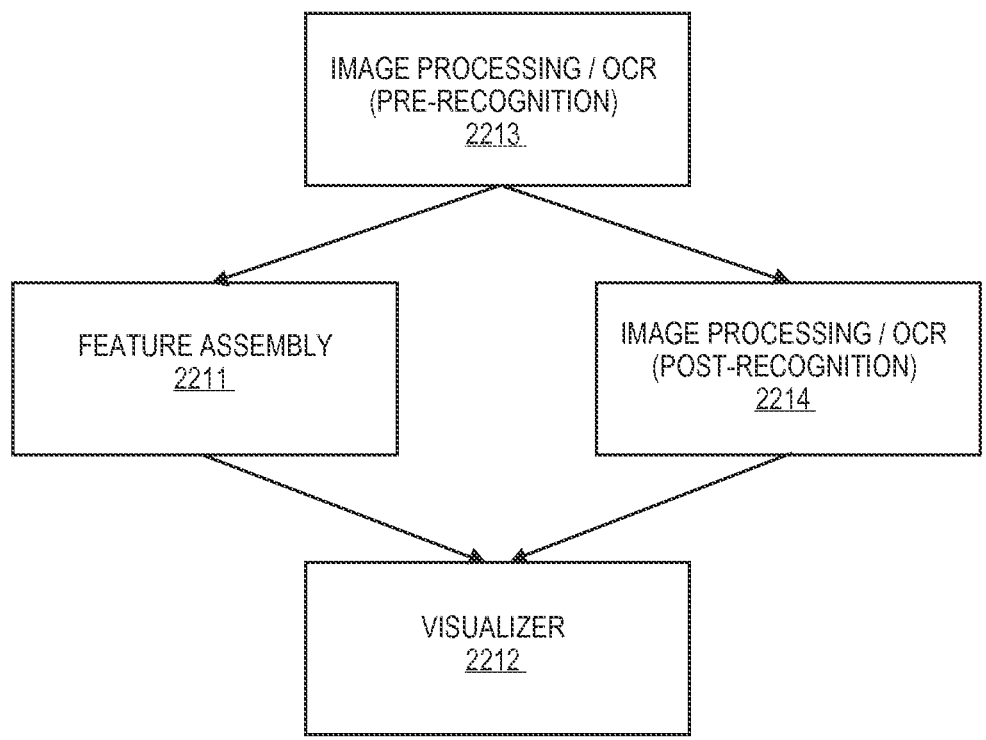
FIG. 22 is a block diagram illustrating a system constructed according to embodiment.

FIG. 22 illustrates in block diagram form system constructed according to one embodiment for implementing embodiments. In the illustrated embodiment, the system includes a feature assembler 2211 and a visualizer 2212. The assembler 2211 receives the result of or output generated by imaging processing 2213 (e.g., segmentation of data generated by an optical recognition process such as OCR before alpha-numeric data or images are recognized), and the visualizer 2212 receives the result or output generated by the feature assembler 2211. In certain embodiments in which interview screen population is also performed by the visualizer 2212, the output of an image processor 244 such as the output or result in the form of recognized text 2214 from an OCR engine is provided to the visualizer 2212 for the purpose of transferring recognized data to respective interview screens 2100.

Figure 23:
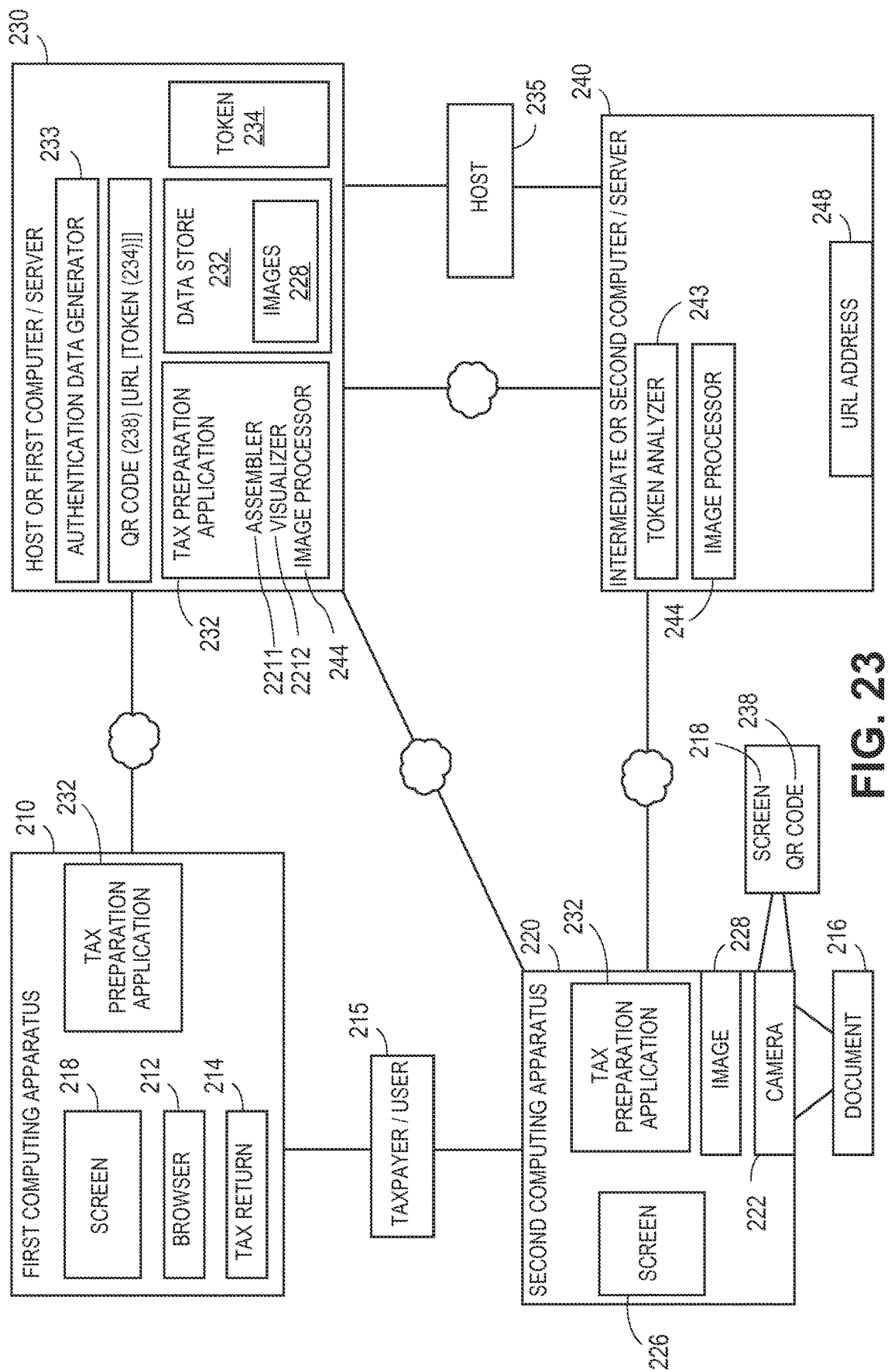
FIG. 23 is a block diagram illustrating a system constructed according to embodiment or involving components for processing source tax document images and encoding user interface elements of a tax preparation application to display an image of the source tax document or portion thereof in response to a request by a taxpayer utilizing the tax preparation application.

Referring to FIG. 23, in one system embodiment involving system components described above with reference to FIG. 2, for example, the taxpayer 215 requests to enter data by imaging a tax document 216. The request is transmitted through the first computing apparatus 210 executing the browser 212 to access the on-line version of the tax preparation application 232. Authentication data 234 or a token is encoded or included within a QR code 238, SMS 239 or e-mail message, which is sent to or imaged by the second computing apparatus 220, which is connected to the second, intermediate computer 240 using the URL address 248 and token 234 within the message to upload or transmit images 228 acquired with the second computing apparatus 220 to the second, intermediate computer 240. Results 247 generated by the image processor 244 are provided to the feature assembler 2211 and/or visualizer 2212 according to embodiments.

While FIG. 23 illustrates one example of how embodiments may be implemented using system components described with reference to FIGS. 2, 9 and 13, it will be understood that embodiments are not so limited. For example, images 228 can be acquired utilizing various imaging devices including a camera or image capture element of a mobile communication device such as a smartphone or tablet computing device, scanner, camera, webcam or other imaging element of the first or second computing apparatus 210, 220, and transmitted to the first computer 230 with or without a token 234, or to the first computer 230 through the second, intermediate computer 240 as described above. Moreover, embodiments may involve an on-line tax preparation application 232 or a locally executing or desktop version of the tax preparation application 232 that executes on the taxpayer's laptop or desktop computer or as an application executing on a mobile communication device utilized to prepare the electronic tax return 214. Further, in embodiments that do not involve the generation of a token 234 or the second, intermediate computer 240, the image processor 244 may be hosted by the first computer 230 and in communication that the tax preparation application 232. Accordingly, it will be understood that embodiments may be implemented using various system configurations, and FIG. 23 is provided as one non-limiting example of system components that may be utilized. For ease of explanation, reference is made generally to a tax preparation application 232.

Figure 24:
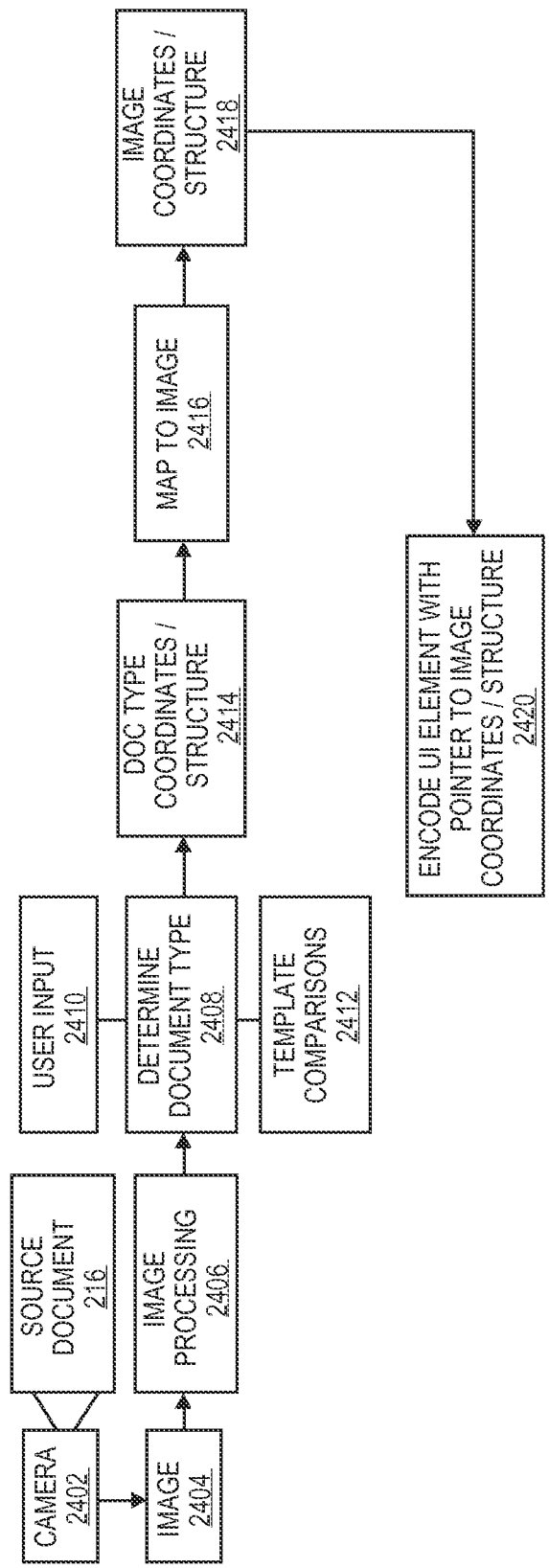
FIG. 24 is a system flow diagram illustrating how embodiments are operable to process source tax document images and encode user interface elements of a tax preparation application to display an image of the source tax document or portion thereof in response to a request by a taxpayer utilizing the tax preparation application.

FIG. 24 generally illustrates one example of how embodiments may be implemented, and FIGS. 25-32 illustrate further aspects of embodiments and image processing performed according to embodiments. As shown in FIG. 24, a camera 222/2402 or other imaging element is used to acquire an image 228/2404 of a tax document 216 that is a source of tax data. While embodiments are described with reference to an image acquired by a camera or imaging element, other embodiments may involve receiving, e.g., through a network, images of tax documents 216 from an employer, financial institution or other generator or source of the tax document 216. Embodiments may also involve images acquired by the taxpayer 215 and received from an employer, FI or other generator. For ease of explanation, reference is made to a tax document 216 being provided to the taxpayer 215, and the taxpayer 215 acquiring an image of the tax document 216.

The image is received by or provided to an image processing program 244/2406 of or utilized by the tax preparation application 232. The image processing program 2406 may be the image processor 244 or module thereof, or a part of the tax preparation application 232. For ease of explanation, reference is made to image processor as shown in FIG. 24.

The image processing program 2406 determines the type 2408 of tax document 216 within the image 228 if user input does not specify or provide input 2410 regarding the type document 216 that was imaged. For example, the image processor 244 may compare image 228 data to tax document templates 2412 in order to determine the document type such as Form W2 or 1099. The structure of the determined document type such as coordinates 2414 of boxes or fields thereof is determined, with reference to templates as necessary, and those coordinates are mapped 2416 to the image such that after determining coordinates for boxes or fields within the image 2418, a UI element 2120 is generated 2420 and encoded with a pointer or reference to the location or coordinates of fields or boxes within the image 228. Further aspects of embodiments and different ways in which embodiments may be implemented are described with reference to FIGS. 25-36.

Figure 25:
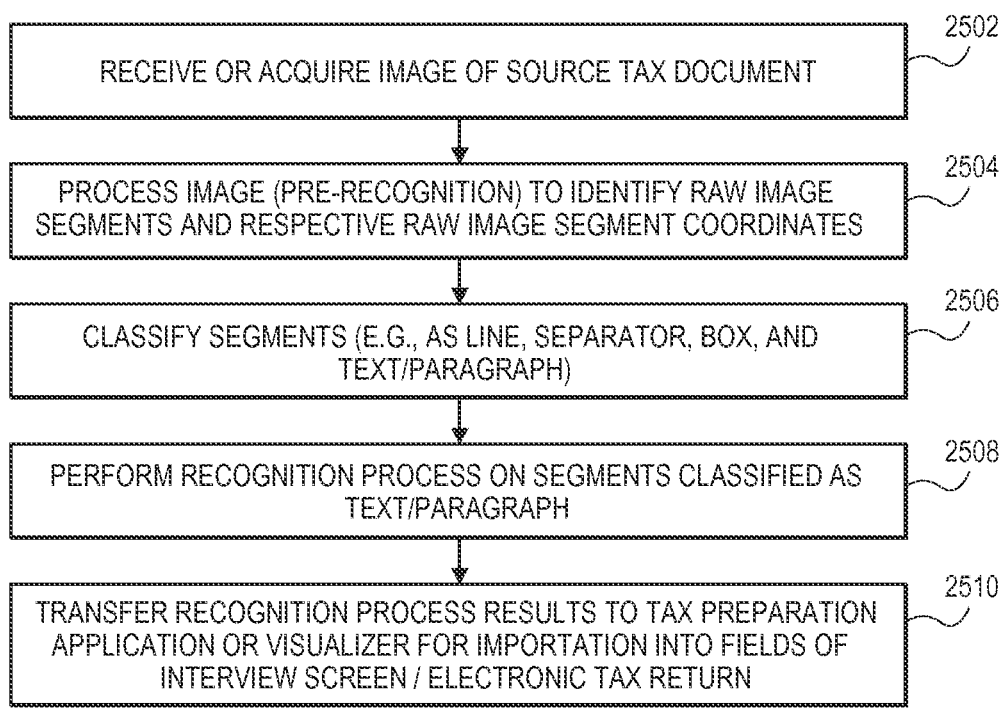
FIG. 25 illustrates a method for processing an image of a source tax document according to embodiments tax document images received at the intermediate computer and transmitting processing results to the host computer for integration into the electronic tax return being prepared.
Figure 26:
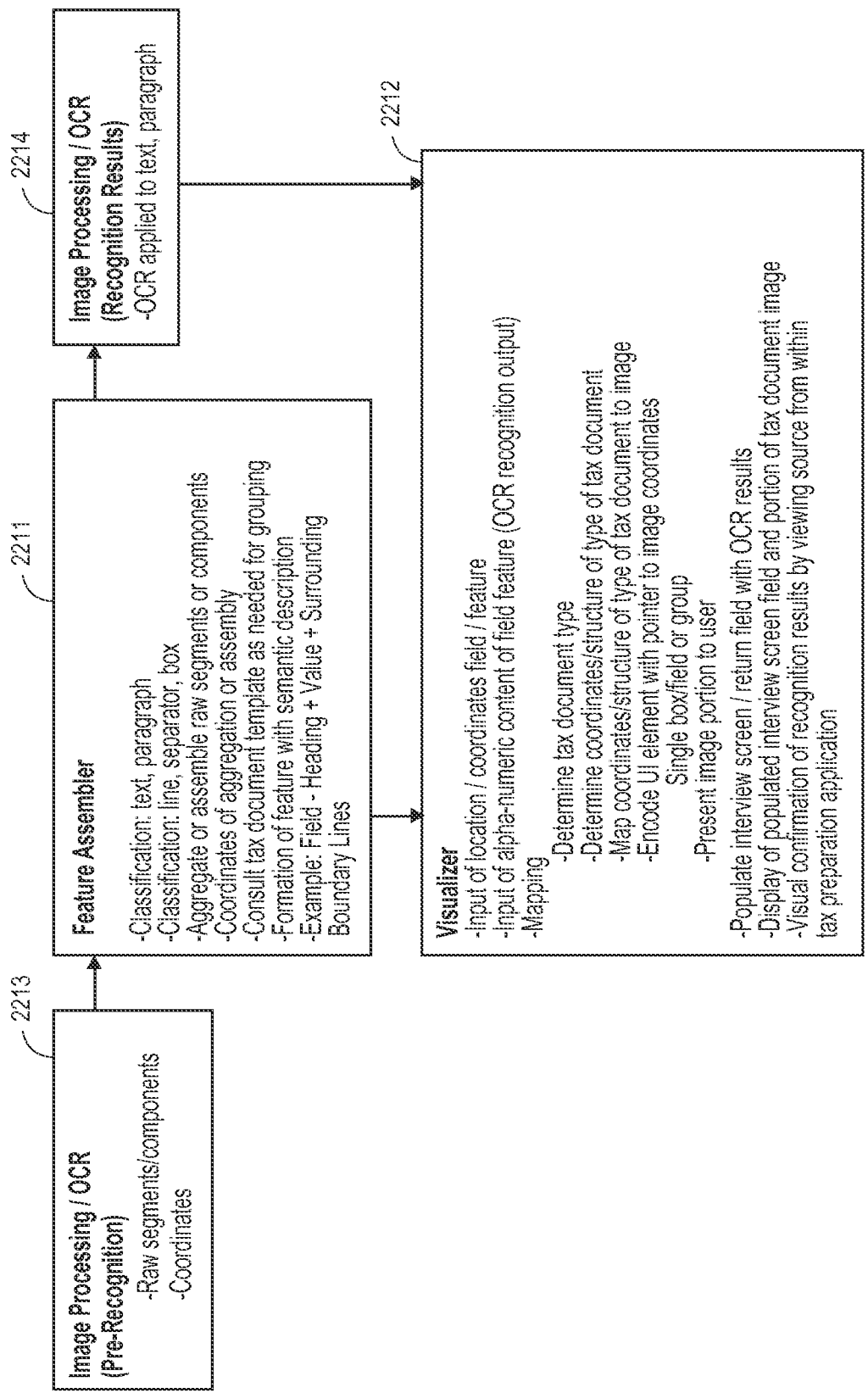
FIG. 26 is a system flow diagram illustrating how components shown in FIG. 23 are operable to process source tax document images and encode user interface elements of a tax preparation application to display an image of the source tax document or portion thereof in response to a request by a taxpayer utilizing the tax preparation application.

Referring to FIG. 25 and with further reference to FIG. 26, in a method according to one embodiment, at 2502, the tax preparation application 232 or feature assembler 2211 thereof or utilized thereby receives an image 228 of a source tax document 216, and at 2504, the image processor 244 of or in communication with the feature assembler 2211 processes the image 228 to transform the image 228 into segments or components and determines the coordinates, location or relative location or spacing of these segments or components. For example, as shown in FIG. 27, the output of an image processor 244 such as an OCR program may transform image 228 into segments or components 2700 such as "Pat," "Williams," Street," "address" and "3434" segments in the illustrated example. Each of the segments 2700 has an associated set of coordinates (x1, x2; y1, y2) defining a segment boundary. Referring to FIG. 28A, data of results of segmentation 2700 can be stored to a table or other data structure in the data store. As shown in FIG. 28A, a table includes columns 2810a-b for data such as identification of the segment 2810a, the segment coordinates, dimensions, spacing or other structure information 2810b.

Referring again to FIGS. 25-26, at 2506, segments 2700 are classified by the feature assembler 2211. In the illustrated embodiment, segment 2700 classifications include: line, separator, box, and text/paragraph. Referring again to FIG. 28, the table shown in FIG. 28A may also include a column 2810c for segment classification data.

Referring again to FIGS. 25-26, at 2508, the image processor 244 performs a recognition process on segments 2700 classified as text/paragraph, and at 2510, in the illustrated embodiment, the resulting alpha-numeric data is transferred to the visualizer 2212, described in further detail below. Column 2810d of the table shown in FIG. 28A can be updated to include recognition results.

Figure 29:
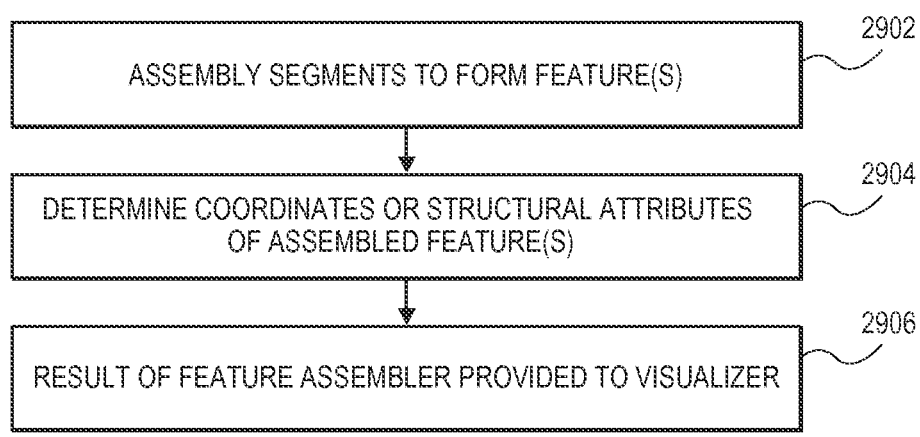
FIG. 29 illustrates a method for aggregating segments resulting from image processing to assemble features according to embodiments.
Figure 30:
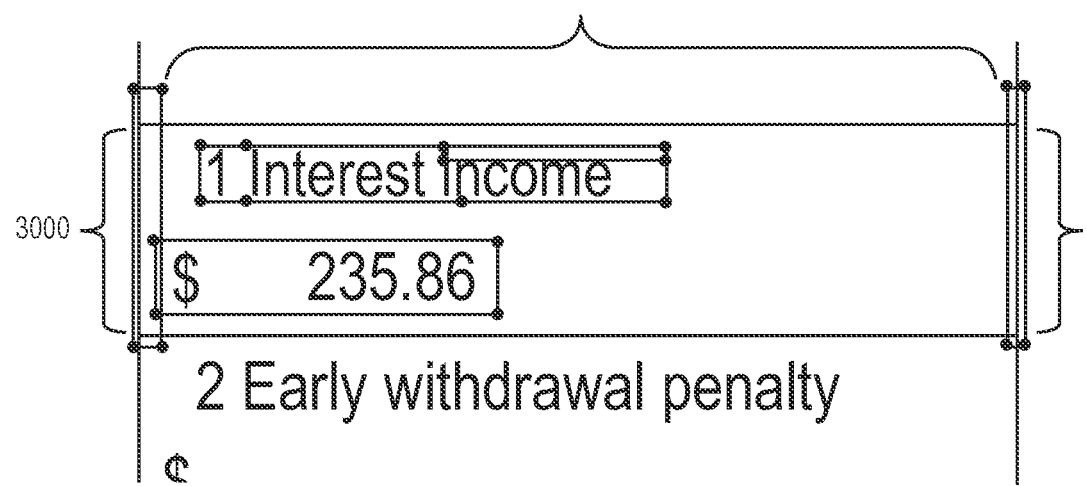
FIG. 30 illustrates an example of assembly of a feature according to embodiments.

Referring to FIGS. 26 and 29-30, at 2902, the feature assembler 2211 aggregates segments 2700 to form one or more features 3000 and determines coordinates (x1, y1; x2; y2 or other structural attributes) of assembled feature(s) 3000 or aggregation or collection of segments 2700. For example, in the illustrated embodiment shown in FIG. 30, a feature 3000 is defined as Field=Heading (1 Interest Income)+Value ($235.86)+Surrounding Boundary lines, or the segments 2700 within the surrounding boundary lines. Columns 2810e-f of the table shown in FIG. 28A can be updated with data of the features 3000 and coordinates thereof, which as shown in FIG. 28A, are coordinates of corner points of the outer boundary lines or corners of the feature 3000. At 2906, the output or results generated by the feature assembler 2211 are provided as an input to the visualizer 2212.

Figure 31:
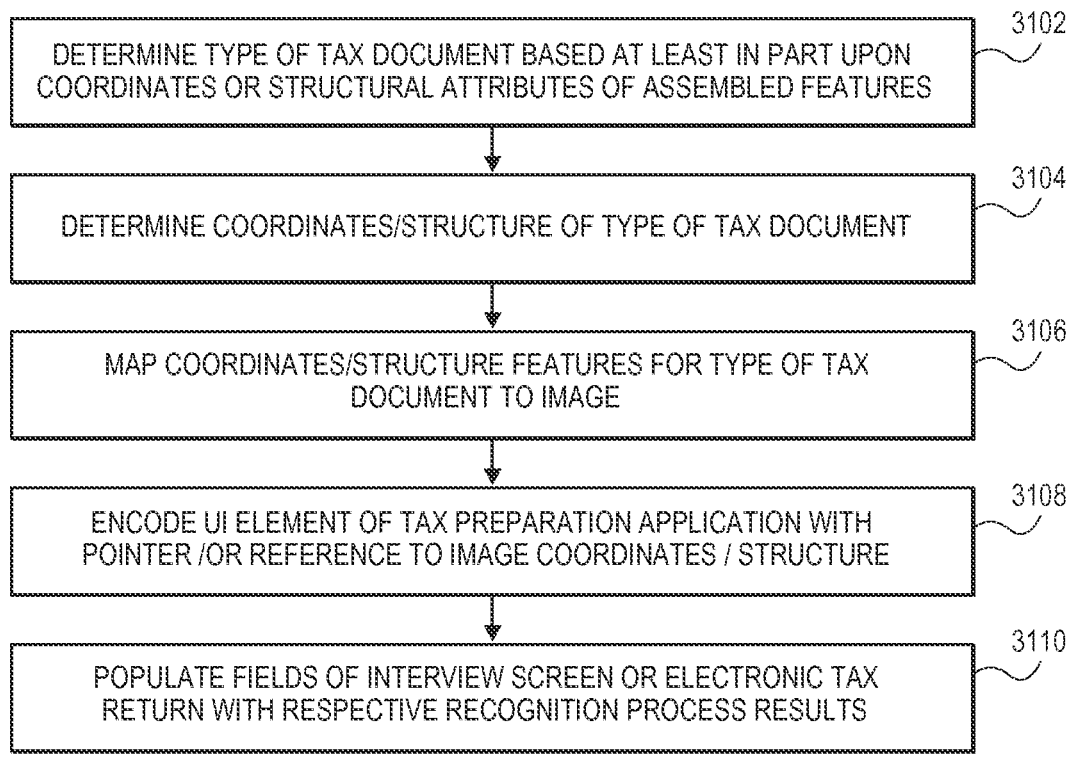
FIG. 31 illustrates a method for determining a type of document and coordinate mapping for encoding user interface elements and populating interview screen fields of a tax preparation application.

With continuing reference to FIG. 26, and with further reference to FIG. 31, at 3102, the visualizer 2212 receives the result or output of the feature assembler 2211 and determines the type of tax document 216 that was imaged based at least in part upon the segment 2700 and/or feature 3000 coordinates or other structural attributes of assembled features 3000 or segments 2700 thereof if the taxpayer 215 has not provided input specifying the document type.

Figure 32:
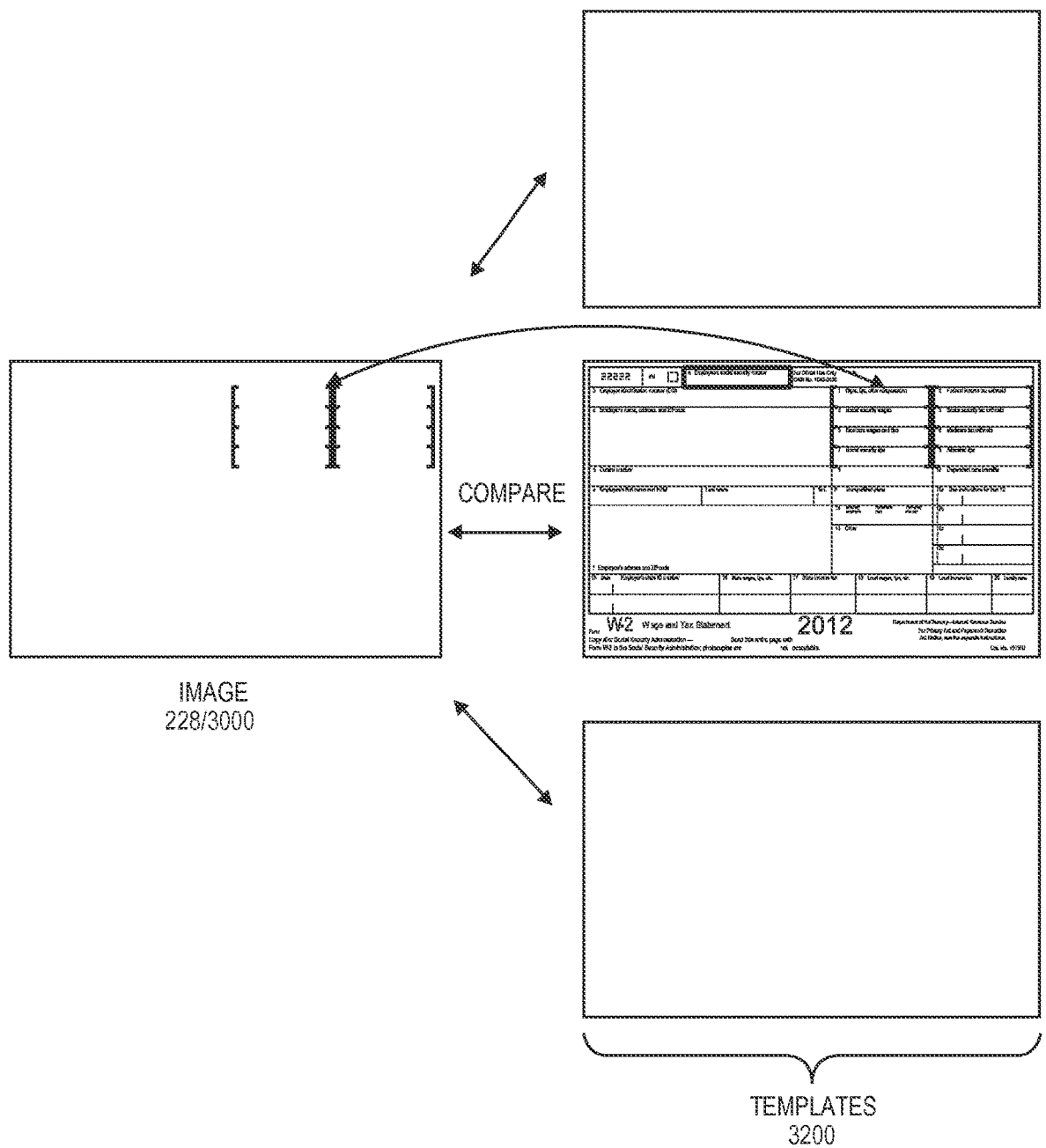
FIG. 32 generally illustrates how a structure, format or coordinate data of an image can be compared to tax document templates for determining which type of tax document was imaged.

According to one embodiment, referring to FIG. 32, determining the document type involves accessing the data store 231 to access a database of tax document templates 3200 and comparing structural attributes or coordinates of features 3000 to structural attributes or coordinates of the tax document templates 3200 to find a matching template 3200 (e.g., Form W2 is shown as being the matching template 3200 as an example).

Referring again to FIGS. 26 and 31, having received or determined the type of tax document 216 that was imaged, at 3104, the visualizer 2212 determines the structure or coordinates of type of tax document 216 based at least in part upon the template 3200, and at 3106, maps those coordinates to the original image 228 of the tax document 216. Referring again to FIG. 28A, columns 2810g-j of the table shown in FIG. 28A can be updated to reflect results of document type determinations, template coordinates, which image corresponds to the features, document type and template coordinates, and the corresponding image coordinates that are determined to correspond to features 3000 or segments 2700 thereof.

With continuing reference to FIG. 31, at 3108, a UI element 2120 of the tax preparation application 232 is encoded with a pointer or other reference to coordinates within the image 228. For this purpose, a table as shown in FIG. 28B may be generated linking the UI element 2120 to corresponding data. In the illustrated embodiment, the table includes columns 2820a-e for the UI element 2120 that was generated, the location within an interview screen 2100 or form or other page generated by the tax preparation application 232 where the UI element 2120 is to be displayed, the location or address within the data store 231 identified by the pointer, the image 228 at that location or address, and the coordinates of that image 228 or coordinates of a portion 228p ("p" referring to "portion") of the image 228.

According to one embodiment, image coordinates are for a portion 228p of the image, e.g., a portion 228p corresponding to the feature 3000 coordinates. Thus, the UI element 2120 may be associated with an interview screen field 2110 for Form W-2, Box 1, for example, and the UI element 2120 pointer will identify the data store 231 location having the image 228 of the Form W-2, and the coordinates of the portion 228p of the image for Box 1 containing Form W-2, Box 1. A separate image of the portion 228p (e.g., image or selected crop of image of only Box 1 of Form W-2) may be generated by cropping the received or acquired image 228 of Form W-2, and the pointer will refer to the image 228 containing only that smaller or cropped image portion 228p. According to other embodiments, the UI element 2120 pointer will identify the data store 231 and coordinates of a portion 228p for Box 1 and including other boxes or sections, e.g., adjacent or proximate boxes to provide the taxpayer with additional data for reference and to illustrate more particularly the source of the data. In yet other embodiments, the UI element 2120 pointer will identify the data store 231 and coordinates of a separate image of the portion 228p (e.g., image of Box 1 and adjacent or proximate Boxes 2-4 of the image of Form W-2) generated by cropping the received or acquired image 228 of Form W-2, and the pointer will refer to the image containing only that smaller or cropped image portion 228p.

At 3110, if the interview screens or forms of a tax return generated by the tax preparation application 232 have not yet been populated with the imaging processing or OCR results, in one embodiment (as illustrated), those results are provided to the visualizer 2212, which populates fields 2120 of interview screen or forms of the electronic tax return generated by the tax preparation application 232 with respective image processor 244 or recognition process results using a table (e.g., as shown in FIG. 28C) or cross-referencing one or more other tables (e.g., as shown in FIGS. 28A-B) as needed to transfer or map the OCR results to respective fields 2110 of respective screens 2120 generated by the tax preparation application 232. An example of a table that may be generated or utilized is shown in FIG. 28C and includes columns 2830a-d with data identifying the interview screen 2100 or tax return form generated by the tax preparation application 232 and a field 2110 therein, the location of that field 2110 within the screen or form 2100, the UI element 2120 to be associated with that field 2110 and references to recognition data or sources thereof used to populate the fields 2110.

Figure 33:
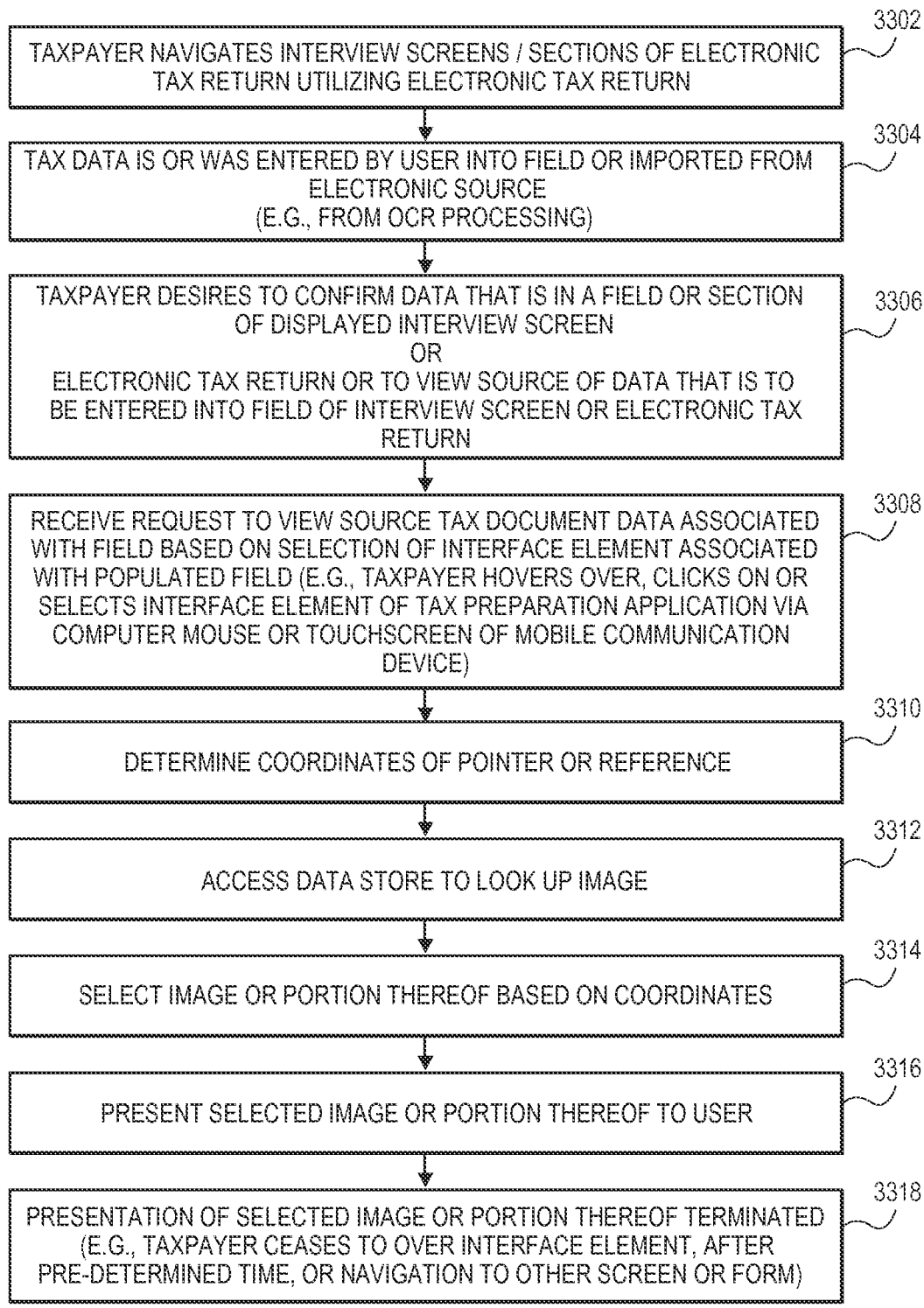
FIG. 33 illustrates a method of how an image of a source tax document or portion thereof is retrieved and displayed through a tax preparation application in response to a taxpayer selecting a user interface encoded according to embodiments.

Referring again to FIG. 26 and with further reference to FIG. 33, during use by the taxpayer 215, the tax preparation application 232 is executed, and at 3302, the taxpayer 215 navigates interview screens or forms 2100. At 3304, the taxpayer 215 manually enters data into fields 2110 of the interview screens or forms 2110 generated by the tax preparation application 232 if such data has not already been imported from an electronic file (e.g. from a file of QUICKEN financial management system to TURBO TAX tax preparation application) or from the visualizer 2212 utilizing the image processor 244 or OCR recognition results, or requests that such data be transferred or imported.

At 3306, the taxpayer 215 desires to determine or confirm data of a field 2110 or section of a displayed interview screen 2110, and at 3308, receives a request to view data of the source tax document 216 associated with a field 2110 in the form of the taxpayer 215 clicking on, hovering over or selecting a UI element 2120 associated with the field 2110. For example, the taxpayer 215 may utilize a computer mouse or other input element such as a voice command, or a touchscreen of a mobile communication device to hover over or click or select a UI element 2110 of the tax preparation application 232. In response to receiving the request, at 3310, the tax preparation application 232 or visualizer 2112 thereof reads data of the pointer or reference to determine a location in the data store 231 of the image 228 or image portion 228p to be retrieved (entire tax document image or portion thereof as discussed above), and the coordinates of the image 228 or portion 228p to be displayed. At 3312, the visualizer 2212 accesses the data store 231, looks up the image 228 or portion 228p according to the determined location, and as necessary, selects a portion 228p of the image 228 based on the coordinates at 3314 if an image portion 228p or crop of an original image 228 has not been generated. As described above, the image 228 referenced may be previously cropped, or the entire image 228 is accessed and then cropped or a portion 228p of the image is then selected. At 3316, the image 228 or portion 228p thereof is presented to the taxpayer 215 through the display generated by the tax preparation application 232, and then at 3318, the presentation of the image 228 or selected portion 228p thereof is terminated, e.g., when the computer mouse cursor or pointer ceases to hover over the UI element 2120, after pre-determined time, or navigation to another interview screen or form of the tax preparation application 232.

Figure 34E:
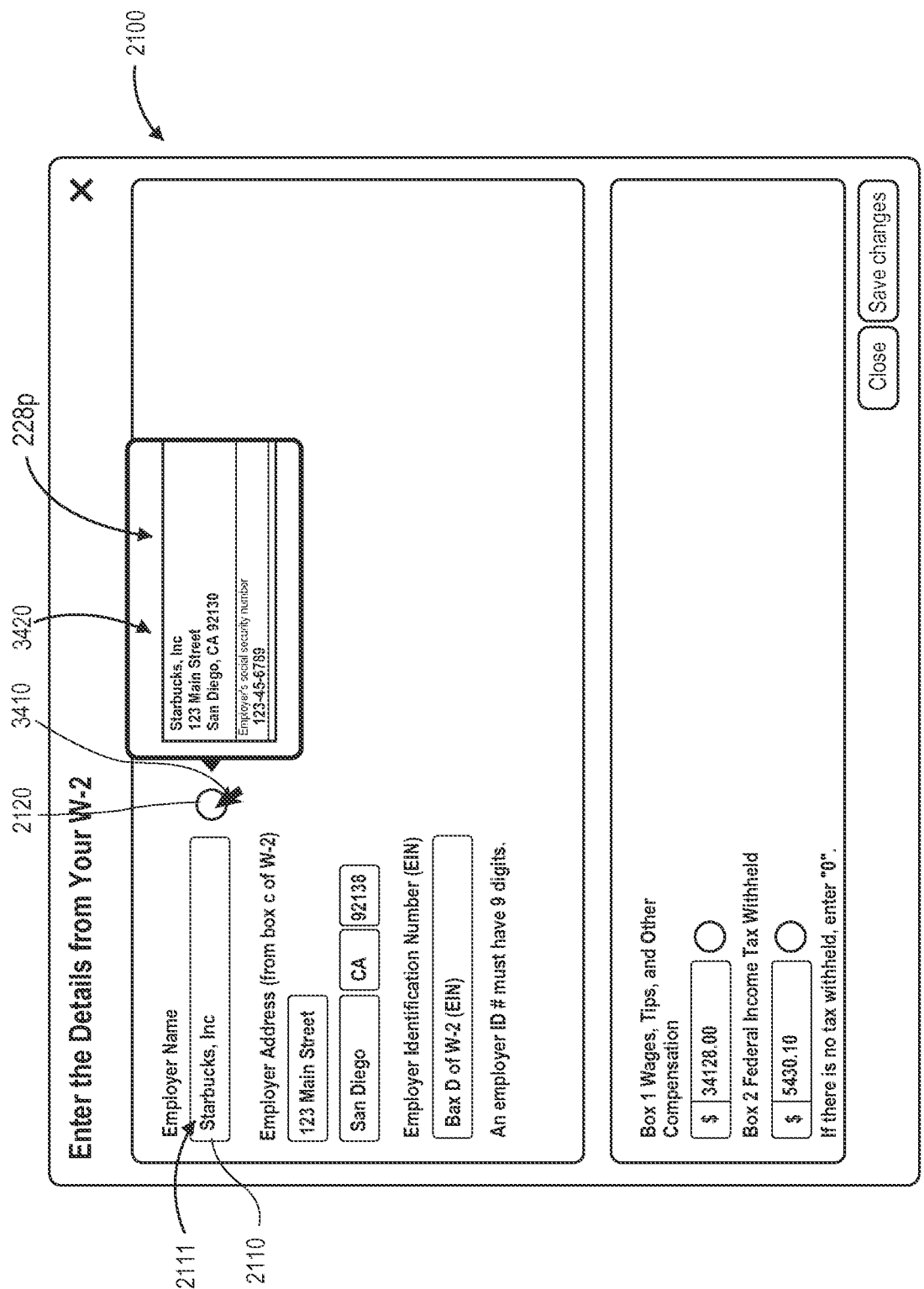

FIGS. 34A-E, 35A-D and 36 are screen shots showing how embodiments may be implemented. FIG. 34A illustrates an interview screen 2100 generated by the tax preparation application 232 and a field 2110 for Employer Name that is populated with the taxpayer's employer 2111 (Starbucks, Inc.). In the illustrated embodiment, a UI element 2120 encoded according to embodiments is displayed adjacent to the UI element 2120 and is in the form of a mouse over UI element. As shown in FIG. 34A, the cursor or pointer 3410 directed by the taxpayer utilizing a computer mouse is not currently located over the UI element 2120, and as shown in FIG. 34B, the taxpayer manipulates the computer mouse to move the cursor or pointer 3410 closer to the UI element 2120.

Referring to FIG. 34C, the cursor and pointer 3410 is now positioned over the UI element 2120. In response, the tax preparation application 232 or visualizer 2112 thereof detects that the UI element 2120 has been selected or activated, and in response to the request to view an image 228 of the document 216 that is the source of the "Starbucks, Inc." Employer Name tax data 2111, the tax preparation application 232 or visualizer 2112 reads data referenced by the pointer or reference and looks up or retrieves the image 228, image portion 228p, or selects a portion 228p of the image 228. The image 228 (as shown in FIG. 34A) or portion 228p thereof is then displayed through the tax preparation application 232 to the taxpayer 215.

In the example shown in FIG. 34C, the initial image displayed is an image 228 of the entire Form W-2 tax document 216 for Starbucks Inc. According to one embodiment, in response to selection another user input (e.g., activation of a scroll wheel of the computer mouse) or automatically (e.g., after a pre-determined time), the visualizer 2112 zooms in from that initial image (which may be a complete image 228 or an image portion 228p) as shown in FIGS. 34D-E such that a portion 228p of the Form W-2 image, or a smaller portion 228p of the previously displayed portion 228p, is displayed. According to one embodiment, the zooming effect 3420 may result in zooming in to display only the particular portion of the image containing the (e.g., portion of the Form W-2 document containing only Box c for Employer Name). In other embodiments, the zooming effect 3420 may result in display of the particular portion of the image and one or more other image portions (as shown in FIG. 34E), which shows the portion of imaged Form W-2 including Box c and information for Starbucks, Inc. (including address) and an adjacent Box d for the employee's social security number.

Figure 35C:
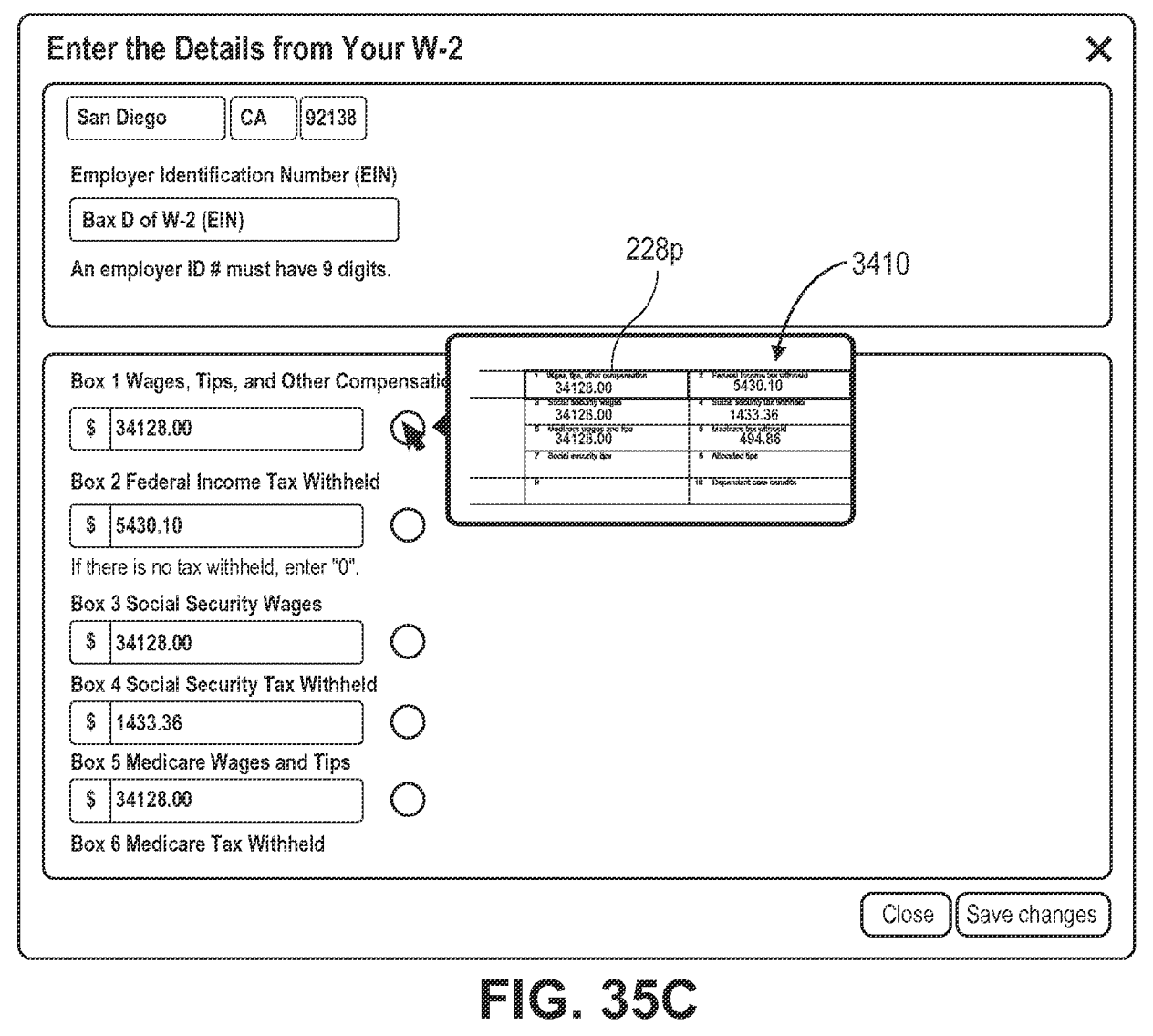

FIGS. 35A-D illustrate another example of how embodiments may be implemented. Referring to FIG. 35A, the tax preparation application 232 generates an interview screen 2100 including a field 2110 for "Box 1 Wages, Tips and Other Compensation." In the illustrated example, data 2111 of $34,128.00 has been manually entered into a field 2110 by the taxpayer, imported from an electronic file or populated with OCR results of image processing 244. As shown in FIG. 35A, the taxpayer 215 has manipulated a computer mouse to position the cursor or pointer 3410 of the computer mouse close to the UI element 2120 associated with the field 2110 containing the 34,128.00 data 2111. Referring to FIG. 35B, the taxpayer 215 has now manipulated the mouse such that the cursor or pointer 3410 is now positioned over the UI element 3420. In response, the tax preparation application 232 or visualizer 2112 displays an image 228 of the source of that tax return data 2111. FIGS. 35C-D further illustrate how a zooming effect 3420 may be applied such that the visualizer 2112 zooms in from the initially displayed image 228 or portion 228p thereof to display a smaller or more focused portion 228p. As discussed above, according to certain embodiments and as shown in the example of FIG. 35B, the initial image displayed is an image of the entire Form W-2 tax document for Starbucks Inc. Referring to FIG. 35C, the visualizer 2112 zooms 3420 in to a more focused portion 228p of Form W-2, e.g., in response to selection another user input or automatically after a pre-determined time such that the portion 228p shown in FIG. 35C includes 10 boxes (Boxes 1-10), including Box 1 including Wages, tips, other compensation in the amount of 34,128.00. Referring to FIG. 35D, the visualizer 2112 may also zoom 3410 in to an even more focused portion to display 6 boxes including Box 1. FIG. 35D may represent the final result of zooming 3410, or zooming 3410 can be performed such that the final zoomed image is an image of only the particular Box 1 associated with the particular field generated by the tax preparation application 232.

Figure 36:
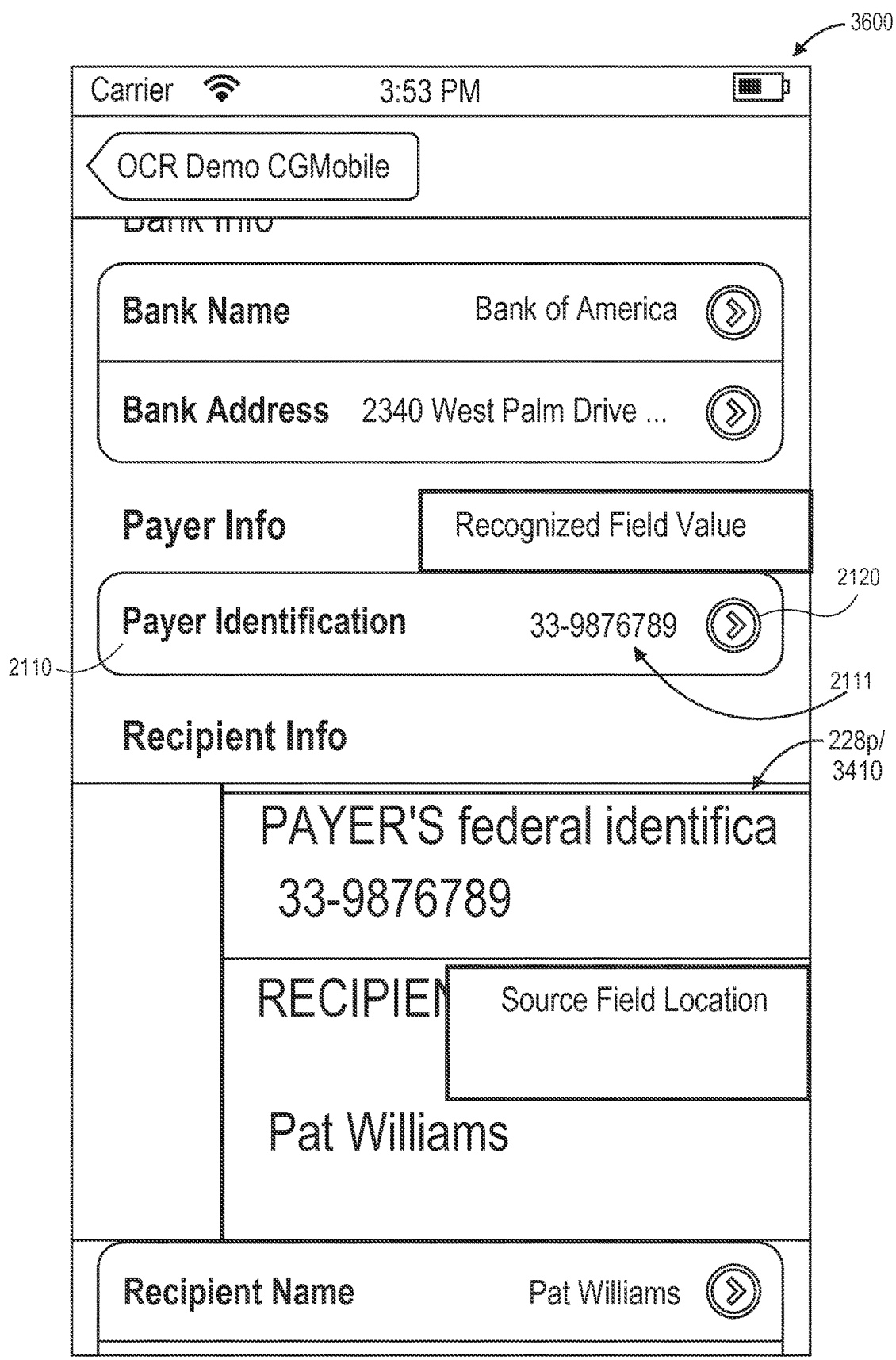
FIG. 36 is a screen shot showing an example of how embodiments may be implemented through a mobile communication device.

FIG. 36 is a screen shot further illustrating how embodiments may be implemented using a mobile communication device 3600 such as a smartphone or tablet computing device. The tax preparation application 232 can be an application that executes on the mobile communication device 3600, or the mobile communication device 3600 may execute a browser to access an on-line version of the tax preparation application 232. In the illustrated embodiment, the interview screen 2100 displayed includes four UI elements 2120 encoded according to embodiments. In the illustrated embodiment, the fields 2110 are already populated with recognized data 2111 provided by the image processor 244 (e.g., OCR processing) including Payer Identification data 33-9876789. In the illustrated embodiment, the taxpayer has engaged the touchscreen to select one of the UI elements 2110 to request display of an image 228 of the source Form W-2 216 to verify the payer information that was imported from OCR processing. In response to selection or activation of the UI element 2120, the visualizer 2112 retrieves the image 228 or portion 228p of the image of Form W-2, and displays the image 228 or portion 228p thereof. In the illustrated embodiment, the visualizer 2112 displays a portion 228p of Form W-2 containing PAYER'S federal identification, and may also display one or more additional fields (as illustrated). As discussed above, the zooming effect 3410 may also be applied to the mobile version, and zooming 3410 may be automatic, or in response to the taxpayer engaging the touchscreen to manually zoom the form image by using one or more fingers and/or thumb, to zoom in or out, and to pan across the tax document image 228 or portion 228p thereof.

Figure 37:
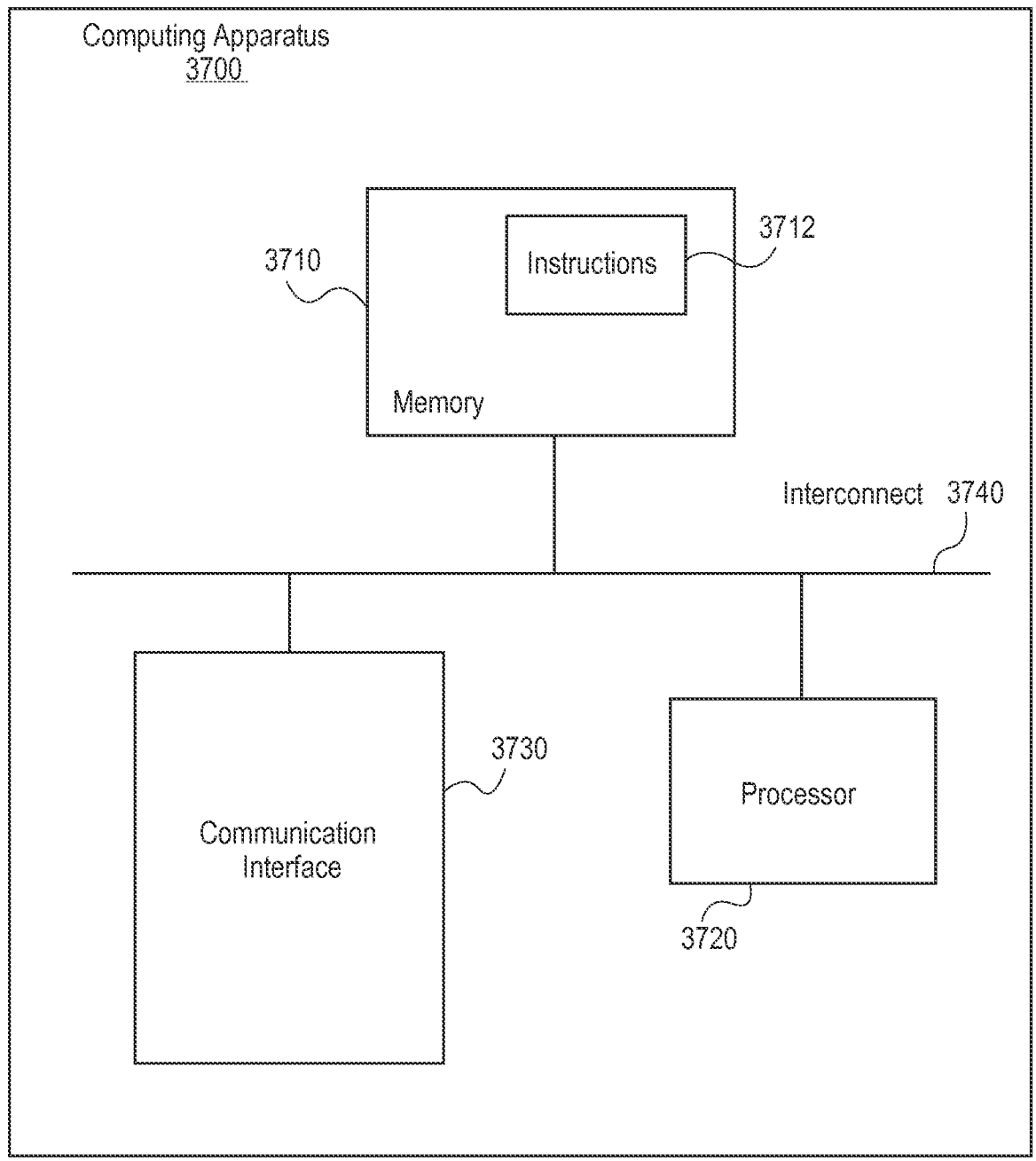
FIG. 37 is a block diagram of components of a computing apparatus or system in which various embodiments may be implemented or that may be utilized to execute various embodiments.

FIG. 37 generally illustrates components of a computing device 3700 that may be utilized to execute embodiments and that includes a memory 3710, account processing program instructions 3712, a processor or controller 3720 to execute account processing program instructions 3712, a network or communications interface 3730, e.g., for communications with a network or interconnect 3740 between such components. The memory 3710 may be or include one or more of cache, RAM, ROM, SRAM, DRAM, RDRAM, EEPROM and other types of volatile or non-volatile memory capable of storing data. The processor unit 3720 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 3740 may include a system bus, LDT, PCI, ISA, or other types of buses, and the communications or network interface may, for example, be an Ethernet interface, a Frame Relay interface, or other interface. The network interface 3730 may be configured to enable a system component to communicate with other system components across a network which may be a wireless or various other networks. It should be noted that one or more components of computing device 3700 may be located remotely and accessed via a network. Accordingly, the system configuration provided in FIG. 37 is provided to generally illustrate how embodiments may be configured and implemented.

Method embodiments may also be embodied in, or readable from, a computer program product or article of manufacture comprising a non-transitory computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 3720 performs steps or executes program instructions 3712 within memory 3710 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, it will be understood that embodiments may be implemented within or executed by a desktop or on-line version of a tax preparation application, or as a native or downloadable application executable on a mobile communication device such as a smartphone or tablet computing or communication device.

Further, while embodiments have been described with reference to processing images of tax documents for purposes of preparing an electronic tax return utilizing a tax preparation application, embodiments may also be utilized with or executed by other financial management systems to image and process images of other types of documents. For example, other embodiments may involve other financial management systems utilized to analyze images of financial documents containing account and/or transaction data in connection with management of personal finances of the user of the financial management system.

Additionally, it will be understood that certain embodiments may be utilized independently of or in conjunction with each other. For example, embodiments related to generation of authentication data for secure transfer of document images and processing thereof for importation into an electronic tax return may be utilized independently or in conjunction with embodiments related to encoding a UI element of an interview screen generated by the tax preparation application utilized to prepare the electronic tax return to view an image of the tax document.

Moreover, while certain embodiments have been described with reference to method steps performed in an exemplary order, it will be understood that various steps may be performed in different orders and/or concurrently. Flow diagrams are provided as non-limiting examples of how embodiments may be implemented.

Accordingly, embodiments are intended to exemplify alternatives, modifications, and equivalents that may fall within the scope of the claims.

What is claimed is:

1. A computer-implemented method, comprising:
    a host computer, in communication through respective networks with a first computing device of a preparer and an intermediate computer, executing an on-line tax preparation application for access by a browser of the first computing device and for utilization by the preparer to enter data into an electronic tax return;
    the host computer receiving a request by the preparer for the host computer to populate the electronic tax return with data, wherein the request is received by the host computer via the online tax preparation application and from the first computing device;
    in response to the request, the host computer generating and transmitting authentication data in a manner that a second computing device of the preparer can receive the authentication data, wherein the second computing device is different than the first computing device;
    an intermediate computer establishing an authenticated and secure network connection with the second computing device using the authentication data generated by the host computer;
    receiving at the intermediate computer via the network connection an image of a tax document acquired by the second computing device;
    the intermediate computer processing the image;
    the host computer receiving a result of processing the image from the intermediate computer; and
    the host computer, by the on-line tax return preparation application, populating at least a portion of the electronic tax return based at least in part upon the result.

2. The method of claim 1, wherein the authentication data is an authentication token.

3. The method of claim 1, wherein the authentication data is associated with restriction data indicating when the authentication data is valid for use by the second computing device to establish the network connection between the second computing device and the intermediate computer.

4. The method of claim 3, the restriction data comprising a duration of time from generation of the authentication data by the host computer.

5. The method of claim 4, the restriction data comprising a number of times the authentication data can be utilized.

6. The method of claim 5, the authentication data comprising a single use token.

7. The method of claim 3, further comprising the host computer:
    receiving an electronic message from the intermediate computer that the authentication data was not valid; and
    notifying the preparer through the first computing device or through the second computing device that the authentication data was not valid.

8. The method of claim 3, further comprising the host computer:
    receiving an electronic message from the intermediate computer that the authentication data was not valid; and
    generating new authentication data that is communicated to the second computing device of the preparer, wherein the new authentication data is utilized to establish the network connection between the second computing device and the intermediate computer.

9. The method of claim 1, wherein the intermediate computer receives during the connection multiple tax document images acquired by the second computing device, and results of processing images of multiple tax documents are received by the host computer from the intermediate computer.

10. The method of claim 1, wherein the host computer generates respective authentication data for transferring respective individual tax document images from the second computing device to the intermediate computer.

11. The method of claim 1, further comprising the host computer transforming the authentication data from a first format into electronic data of a second format different than the first format, wherein the authentication data in the second format is communicated to the second computing device of the preparer.

12. The method of claim 11, wherein the host computer initially presents the electronic data of the second format to the preparer via a display of the first computing device while the first computing device is accessing the on-line tax preparation application.

13. The method of claim 11, wherein the host computer is also in communication with the second computing device through a network, further comprising the host computer transmitting the electronic data of the second format to the second computing device without passing through the first computing device.

14. The method of claim 1, wherein the host computer encodes a Quick Response (QR) code with a Uniform Resource Locator (URL) address embodying the authentication data, and presents the QR code to the preparer through a display of the first computing device.

15. The method of claim 14, further comprising establishing a secure connection session between the second computing device and the intermediate computer using the authentication data generated by the host computer, and the intermediate computer receives the image of the tax document from the second computing device through the secure connection.

16. The method of claim 14, further comprising the second computing device acquiring an image of the QR code presented through the display of the first computing device, and decoding QR code by the second computing device to determine the URL address of the intermediate computer.

17. The method of claim 1, wherein the host computer is also in communication with the second computing device through a network, further comprising the host computer:

generating a SMS message comprising a Uniform Resource Locator (URL) address embodying the authentication data; and transmitting the SMS message to the second computing device.

18. The method of claim 17, wherein the SMS message is not transmitted by the host computer to the first computing device.

19. The method of claim 1, wherein the host computer does not allow the second computing device access to the on-line tax preparation application.

20. The method of claim 19, wherein the first computing device is a desktop computer, and the second computing device is a tablet or smartphone device.

21. The method of claim 1, further comprising the intermediate computer initiating imaging of the tax document by the second computing device scanning a QR code that is presented on a display of the first computing device.

22. The method of claim 1, further comprising the host computer:

receiving, from the first computing device, a phone number of the second computing device;

generating a SMS message comprising authentication data; and transmitting the SMS message to the second computing device.

23. The method of claim 22, further comprising the host computer receiving authentication data embodied within the SMS message from the intermediate computer, wherein the intermediate computer receives the authentication data decoded from the SMS message from the second computing device, wherein the second computing device decodes the SMS message from the host computer.

24. The method of claim 1, further comprising the second computing device initiating the imaging of the tax document by the second computing device processing a SMS message, the SMS message being transmitted by the host computer and being received by the second computing device.

* * * * *